(12) United States Patent
Okayasu et al.

(10) Patent No.: US 6,381,054 B1
(45) Date of Patent: Apr. 30, 2002

(54) OPTICAL PULSE TRANSMISSION SYSTEM, OPTICAL PULSE TRANSMITTING METHOD, AND OPTICAL PULSE DETECTING METHOD

(75) Inventors: Toshiyuki Okayasu, Saitama; Nobuhito Kishi, Tokyo, both of (JP)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 09/155,163
(22) PCT Filed: Jan. 22, 1998
(86) PCT No.: PCT/JP98/00246
 § 371 Date: Sep. 22, 1998
 § 102(e) Date: Sep. 22, 1998
(87) PCT Pub. No.: WO98/32247
 PCT Pub. Date: Jul. 23, 1998

(30) Foreign Application Priority Data

| Jan. 22, 1997 | (JP) | 9-009271 |
| Jan. 31, 1997 | (JP) | 9-018712 |
| Aug. 29, 1997 | (JP) | 9-234263 |

(51) Int. Cl.[7] .................. H04B 10/00; H04B 10/12; H04B 10/04; H04B 10/06
(52) U.S. Cl. .................. 359/154; 359/152; 359/173; 359/181; 359/189
(58) Field of Search .................. 359/152, 154, 359/173, 181, 188, 189

(56) References Cited

U.S. PATENT DOCUMENTS 5,515,196 A * 5/1996 Kitajima et al. ............ 359/180
5,612,810 A * 3/1997 Inami et al. ................ 359/189
5,729,371 A 3/1998 Yoshida et al. ............. 359/154

FOREIGN PATENT DOCUMENTS

| DE | 3524871 | 1/1987 |
| EP | 0410757 | 1/1991 |
| JP | 3-114323 | 5/1991 |
| JP | 8-23310 | 1/1996 |

* cited by examiner

Primary Examiner—Jason Chan
Assistant Examiner—M. R. Sedighian
(74) Attorney, Agent, or Firm—David N. Lathrop, Esq.; Gallagher & Lathrop

(57) ABSTRACT

An optical transmission system is provided, which permits high-precision optical transmission of a signal even if the signal has a high accurate timing, an indefinite period, and a DC component. The transmitting side is provided with a rise edge detecting circuit 1 for detecting the rise edge of a transmitting signal waveform, a transmitting pulse generating circuit 2 for generating a transmitting pulse signal (b) constituted by a pair of opposite-polarity pulses inverting their polarities at the detected timing, and a light intensity modulation circuit 3 for generating a light intensity modulated signal (c) based on the pulse signal (b). The receiving side is provided with an AC-coupled receiving circuit 4 for receiving the light intensity modulated signal (c) and extracting therefrom only an AC component, and a discrimination circuit 5 for discriminating the rise timing from the received signal. Further, a similar arrangement is provided for transmitting a signal associated with the fall edge of the transmitting signal waveform. On the basis of the discriminated rise timing and the fall timing, the rise edge and the fall edge of the original transmitting signal waveform are regenerated.

15 Claims, 25 Drawing Sheets

FIG. 10
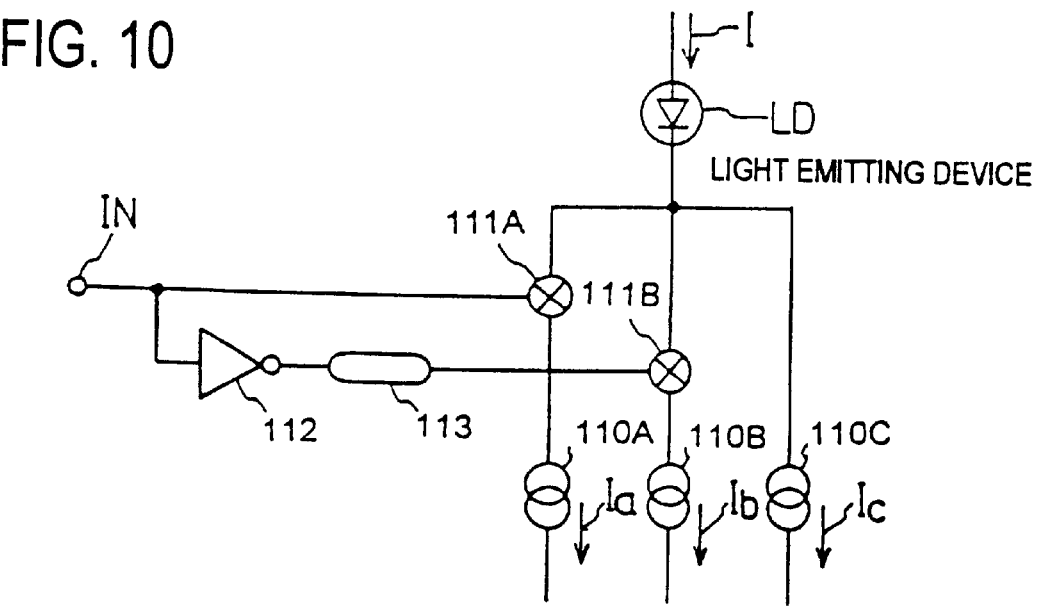
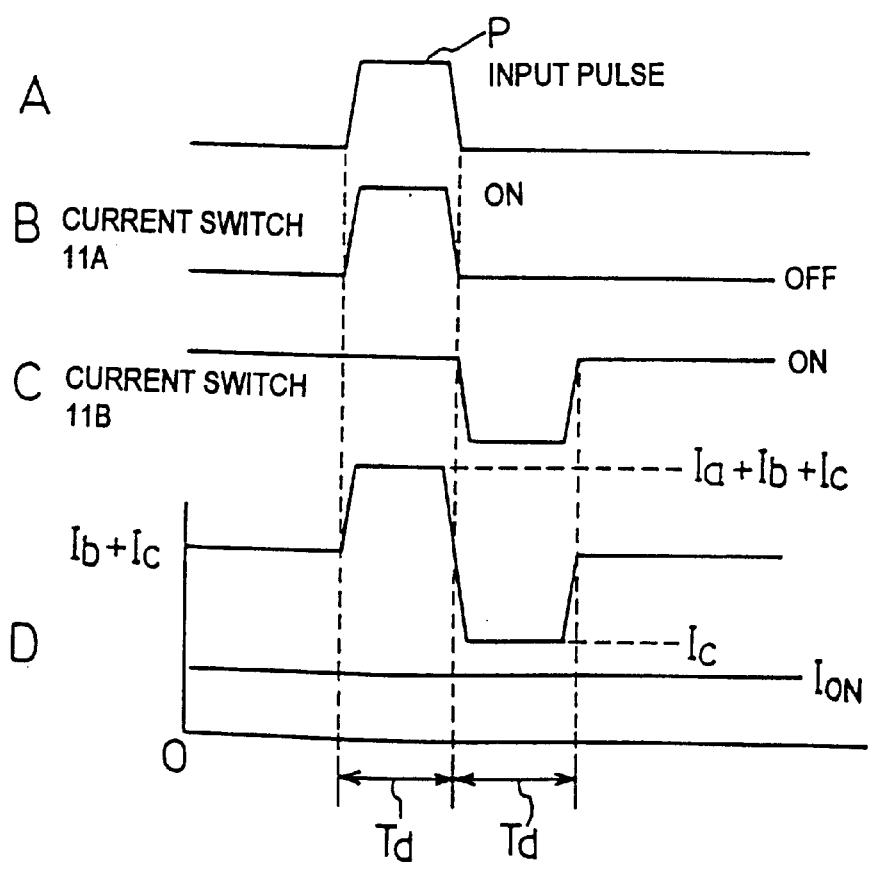
FIG. 11

OPTICAL PULSE TRANSMISSION SYSTEM, OPTICAL PULSE TRANSMITTING METHOD, AND OPTICAL PULSE DETECTING METHOD

TECHNICAL FIELD

The present invention relates to an optical pulse transmission system and an optical pulse transmitting method which permit high-speed transmission of electric signal pulses after converting them into optical pulses. The present invention also pertains to a waveform converting method advantageous for use at the transmitting side for conversion of the electric signal pulses to optical pulses and a light intensity modulator advantageous for use at the transmitting side for the modulation of light, and an optical pulse detecting method advantageous for use at the receiving side for the detection of the optical pulses transmitted thereto.

BACKGROUND ART

Many of semiconductor device testing apparatus (commonly called IC testers) for testing various semiconductor devices, including semiconductor integrated circuits (ICs), for instance, employ a semiconductor device transporting and processing or handling apparatus (commonly called a handler) which transports semiconductor devices for testing and sorts out tested semiconductor devices based on the test results. In the semiconductor device testing apparatus of the type that has the semiconductor device transporting and processing or handling apparatus (hereinafter referred to as handler) connected thereto, a test head for applying a test signal of a predetermined pattern to a semiconductor device under test (commonly called DUT) is placed in a test section of the handler away from the main body (tester proper) of the semiconductor device testing apparatus. The test head and the tester proper are connected via an electric signal transmission line such as a cable, through which the test signal of a predetermined pattern is fed from the tester proper to the test head, and the test signal is applied to the semiconductor device under test via a socket mounted on the test head. A response signal from the semiconductor device under test is sent over the electric signal transmission line from the test head to the tester proper for measuring electrical properties of the semiconductor device.

In recent years, semiconductor integrated circuits (hereinafter referred to as ICs) are becoming faster and the number of terminals (pins) mounted on the package is also on the increase. As a result, the transmission of an electric signal over a transmission line such as a cable as in the above-mentioned semiconductor device testing apparatus will cause such defects as listed below.

(1) With the use of the cable or similar electric wire, there is a limit to the frequency of the electric signal for transmission therethrough, and an increase in the signal frequency is likely to cause the degradation of the signal waveform. This imposes severe limitations on the signal transmission rate, making it difficult to test fast-acting ICs.

(2) Cables now in use are so thick that an increase in the number of cables with an increase in the number of IC terminals will inevitably make thick, heavy and hence hard-to-handle the bundle of cables between the tester proper and the test head.

As a solution to the above-mentioned problems, an optical transmission system has recently come into use which is excellent in the signal transmission rate and in the frequency characteristic as compared with the above-mentioned electric transmission system and is capable of employing, as its transmission medium, an optical fiber or like transmission line which is thin and light. Next, a common optical transmission system will be described.

For the generation of a binary digital signal (optical pulses) by modulating light, a light intensity modulation system which changes the intensity of light according to an information signal (a modulation signal) is used in most instances because of simplicity of the modulation techniques involved. Usually, the light intensity modulation system has a configuration in which a laser diode capable of fast light intensity modulation is provided as a light emitting device at the transmitting side, a fast-response photodiode is provided at the receiving side and an optical fiber is used as a transmission medium; optical pulses emitted from the laser diode at the transmitting side are sent over the optical fiber to the receiving side, where the optical pulses sent thereto are converted by the photodiode to electric signals.

FIG. 23 is circuit diagram schematically depicting an example of a conventional optical transmission system using an optical transmission line. The illustrated optical transmission system comprises an optical pulse transmitting device 101, an optical pulse receiving device 102, and an optical transmission line 109, such as an optical fiber, for interconnecting the transmitting device 101 and the receiving device 102.

The optical pulse transmitting device 101 is provided with a main circuit 103 for outputting an electric pulse signal to be sent to the receiver side, a driving circuit 104 connected at its input terminal to an output terminal 103A of the main circuit 103, and a semiconductor laser or similar light emitting device 105 connected between the output terminal of the driving circuit 104 and a common conductor. The light emitting device 105 responds to an electric pulse signal fed thereto from the driving circuit 104 to emit light and hence generate optical pulses, which are provided via an optical connector 109A onto the optical transmission line 109 for transmission to the optical pulse receiving device 102.

The optical pulse receiving device 102 comprises a photodiode or similar photodetector 106, a detecting circuit 107 connected at its input terminal to the output terminal of the photodetector 106, and a main circuit 108 connected at its input terminal to the output terminal of the detecting circuit 107; the optical pulses sent over the optical transmission line 109 are input into the photodetector 106 via an optical connector 109B. The photodetector 106 converts the received optical pulses to an electric pulse signal, and applies it to the detecting circuit 107. The detecting circuit (usually formed by a current-to-voltage converting amplifier) 107 detects the electric pulse signal fed thereto and provides it to the main circuit 108. The main circuit 108 performs various processes based on the electric pulse signal input thereto.

In general, a laser diode is used as the light emitting device 105, but as is well-known in the art, the laser diode has a defect that the quantity of light emitted therefrom varies with a temperature change. FIG. 24 shows injected current vs. output light power characteristics of the laser diode. In FIG. 24 the curve A indicates the injected current vs. output light power at a temperature T1 (° C.) and the curve B the injected current vs. output light power at a temperature T2 (° C.) (where T1<T2).

As is evident from FIG. 24, current values $I_{ON1}$ and $I_{ON2}$ for driving the laser diode to emit light vary with ambient temperature. As a result, if a driving current $I_D$ of the same peak value as the above-mentioned current values is used to drive the light emitting device 105 by the driving circuit 104, the light emitting device 105 outputs an optical pulse OP1 at the temperature T1 (° C.) and an optical pulse OP2 at T2 (° C.) as depicted in FIG. 24.

As will easily be understood from FIG. 24, an ambient temperature variation will cause a change in the power of the optical pulse that is output from the light emitting device 105. Hence, in the case of receiving the optical pulses OP1 and OP2 by the optical pulse receiving device 102, optical pulse waveforms, which cross a threshold voltage EC for detecting the reception of the optical pulses, lag in timing according as peak values of the received signals are large or small, as indicated by Δt1 and Δt2 in FIG. 25. This entails a disadvantage that the temperature variation is sent as jitter to the receiving device 102.

A real-world example in which the generation of jitter is disadvantageous can be found, for example, in the application of the above-mentioned optical transmission system to the semiconductor device tester. As referred to above, in the semiconductor device tester the test head with a socket mounted thereon is placed apart from the tester proper. The test head comprises a driver for applying a test signal of a predetermined pattern or the like to the semiconductor device under test, a comparator for receiving a response output signal from the semiconductor device under test and for making a logical-level decision; furthermore, the test head serves as an interface with the semiconductor device. And there are provided many signal transmission lines between the tester proper and the test head.

Where these signal transmission lines are each formed by an optical transmission line like an optical fiber to transmit a high-speed signal (an optical pulse), the optical transmission line 109 needs to have a multi-channel structure. In a system configured to transmit and receive optical signals over such a multi-channel optical transmission line, a temperature change causes jitter in the pulse being transmitted; furthermore, when the amount of jitter differs for each channel, a timing error is induced between optical signals sent over the transmission lines of the respective channels, making it impossible to test semiconductor devices (ICs) under normal conditions.

In FIG. 26 there is depicted an example of a light intensity modulator for use in such an optical transmission system as mentioned above. This light intensity modulator is equipped with an input side comparator 200 which receives the signal voltage of a digital input signal (an electric pulse signal) and a threshold voltage and compares these voltages, a current switching circuit 201 which turns ON/OFF in accordance with the result of comparison by the input side comparator 200, and a semiconductor laser 202 which is driven on the basis of a current waveform resulting from the ON/OFF operation of the current switching circuit 201. The current switching circuit 201 comprises a pair of transistors TR1 and TR2 having their emitter connected in common, and a pair of transistors 203 and 205 having their bases connected in common. The collectors of the pair of transistors TR1 and TR2 are connected to terminals of the semiconductor laser 202 corresponding thereto, respectively, and their common-connected emitter is connected to the collector of the transistor 203.

In the light intensity modulator of the above construction, when the right-hand transistor TR2 of the pair of emitter-common transistors TR1 and TR2 forming the current switching circuit 201 is ON, current controlled by the transistor 203 in advance is injected into the semiconductor laser 202, which generates an optical output of a level corresponding to the magnitude of the injected current. Incidentally, a DC bias current necessary for driving the semiconductor laser 202 is controlled by a transistor 204 which has its collector connected to a current injection terminal of the semiconductor laser 202.

By generating a binary optical signal, i.e. optical pulses by the above light intensity modulator, it is possible to implement an optical transmission system which transmits optical pulses at high speed. For example, in the aforementioned semiconductor device tester, however, pulses of many different periods are mixed on the optical signal transmission line between the tester proper and the test head; moreover, very high precision of timing is required in the modulation of light. Accordingly, the application of the above-mentioned optical transmission system to the semiconductor device tester may encounter such problems as mentioned below.

(1) In general, the light intensity is unstable in level (the low-frequency component fluctuates greatly); therefore, when a binary optical signal is discriminated using a fixed threshold level at the receiving side as depicted at the lower part in FIG. 27, errors occur in data (0, 1) and timing as shown. The upper waveform in FIG. 27 shows an electric pulse to be sent from the transmitting side.

(2) The rise time (a light emission delay time) of such a light emitting device as a semiconductor laser varies with the device temperature, and in general, the rise time differs from one device to another. Hence, the light emission delay time differs with temperature changes or with devices as shown in FIG. 28. The difference in the light emission delay time constitutes a factor in causing the above-mentioned timing error.

To solve the above problem (1), there have been proposed a method that effects temperature control to keep the device temperature constant and a method that monitors the light intensity and maintains the device output at a fixed level (to stabilize the light intensity). However, either method involves an expensive transmission module, and hence presents a problem in terms of cost although it can be implemented in a semiconductor device tester or the like which requires a number of transmission lines. Additionally, the stabilization of light intensity is hard to perform in the case of transmitting optical pulses at high speed.

As a solution to the above problem (2), there has been proposed a method that does not provide the binary optical signal by the emission and extinction of light by the light emitting device but instead, as depicted in FIG. 29, drives the light emitting device in a state of emitting light of a certain level (offset light) at all times and generates the binary optical signal according as the light intensity varies from the offset light. With this method, since the light emitting device emits light at all times, the light emission delay time is less affected by the temperature change and is not likely to differ from one device to another. However, the SN ratio lowers because the difference in light intensity between the binary data "1" and "0". In addition, since the both pieces of data "1" and "0" of the binary signal is affected by the light intensity variation, the settlement of the above-mentioned problem (1) becomes increasingly important.

In a multi-channel transmission module for use in a technical field which requires a number of transmission line, such as an ATM (Asynchronous Transmission Mode) exchange, there is adopted a method that the receiving side extracts only a proper AC component of the optical signal (AC coupling) and discriminates the binary signal based on the threshold level set at 0 V as depicted in the lower portion of FIG. 30. Incidentally, the upper waveform in FIG. 30 shows the electric pulse signal to be transmitted from the transmitting side.

With this method, it is true that timing and data errors can be reduced relatively easily. But if the ratio between the binary data "1" and "0" inclines toward one particular data value, the threshold level also shifts towards that data value, resulting in the occurrence of a timing error. It is a matter of course that DC-wise data fixed for a long time cannot be discriminated, besides it is also impossible to detect which data value continues for a long time.

In other words, according to the above AC coupling method using the threshold level set at 0 V, when the data value is left in a fixed state (for example, in a state in which no signal is present), a low-level fluctuation by noise caused in that state will be detected erroneously as one of the data values of the binary signal. Thus this method has a shortcoming that the data values of the binary signal need to vary at all times so as to prevent the above-mentioned erroneous detection. Accordingly, this method cannot be employed in a system in which signals of many different periods are mixed and the data value of the binary signal inclines heavily toward one particular value (0 or 1), that is, in a system in which the DC component is present and the timing accuracy is regarded as important, for example, as in the case of transmitting signals between the tester proper and the test head in the semiconductor device tester.

Further, there has also been proposed such a method as depicted in FIG. 31. With this method, a rise edge and a fall edge of a binary electric signal are detected, then a pulse signal corresponding to the detection of each edge is generated, followed by a pulse signal having its polarity inverted, that is, upon detection of the rise edge, a positive pulse signal is generated and a negative pulse signal having its polarity inverted is continuously generated, thereby to form a pair of pulses having their polarities opposed to each other (opposite-polarity pulse pair), and upon detection of the fall edge, a negative pulse signal is generated and a positive pulse signal having its polarity inverted is continuously generated, thereby to form a pair of pulses having their polarities opposed to each other (opposite-polarity pulse pair). Based on these opposite-polarity pulse pairs, a semiconductor laser is driven to create similar opposite-polarity optical pulse pairs which are transmitted to the receiving side.

With this method, since the transmitted optical pulse pairs are optical signals indicating individual timing of the rise and fall of the binary electric signal to be transmitted, the receiving side can regenerate the original binary electric signal by receiving the timing-indicating optical signals and discriminating between the rise and the fall timing of the original signal. Hence, this method can satisfactorily be applied even to the system in which signals of many different periods are present and the data value of the binary signal inclines heavily toward a particular value (0 or 1) as in the case of transmitting signals between the tester proper and the test head in the semiconductor device tester.

That is to say, since the receiving side needs only to receive opposite-polarity optical pulse pairs as timing signals concerning the rise and fall of the original signal, there is no possibility of the threshold level inclining toward a particular one of the data values, causing an error in timing or in data value. Besides, it is also possible to accurately discriminate the DC-wise data value fixed for a long time.

In FIG. 32 there is depicted an example of a conventional driving circuit which detects the leading and fall edges of a binary electric signal, then generates an opposite-polarity pulse pair upon detection of each edge, and drives a semiconductor laser accordingly.

The driving circuit is provided with: an OR circuit 300 which receives at one input terminal a binary electric signal to be sent; a first inverting circuit (an inverter) 301 which inverts the polarity of the binary electric signal to be sent; a first delay circuit 302 which delays the output signal from the inverter 301 by a predetermined time interval and applies the delayed signal to the other input terminal of the OR circuit 300 and one input terminal of an AND circuit 303; a second inverting circuit (an inverter) 304 which inverts the polarity of the output signal from the delay circuit 302; and second delay circuit 305 which delays the output signal from the inverter 304 by a predetermined time interval and applies the delayed signal to the other input terminal of the AND circuit 303. Incidentally, the output signals from the OR circuit 300 and the AND circuit 303 are applied, in opposite polarity, to a semiconductor laser 312.

With the driving circuit of the above construction, it will easily be understood that, as shown in FIG. 33, a positive-logic pulse waveform (d) and a negative-logic pulse waveform (e) are generated from leading and fall edges (a) to (c) of an input binary electric signal and are added together to form opposite-polarity pulse pairs (f). Based on the opposite-polarity pulse pairs (f), the semiconductor laser 312 is driven to generate pairs of opposite-polarity optical pulses as depicted in the lower part of FIG. 31.

In the generation of the opposite-polarity pulse pairs (f) by adding the positive-logic pulse waveform (d) and the negative-logic waveform (e) derived from the leading and fall edges of the binary input electric signal, the polarity inverting portion of each opposite-polarity pulse pair forms a joint between the positive-logic waveform (d) and the negative-logic waveform (e). Hence, in the conventional driving circuit, the polarity inverting portion of the opposite-polarity pulse pair required to be highly accurate may sometimes form a discontinuous edge, incurring the possibility of timing accuracy being impaired.

DISCLOSURE OF THE INVENTION

A first object of the present invention is to provide an optical transmission system and method which can obviate the above-described problems of the prior art.

A second object of the present invention is to provide an optical transmission system and method which permit high-precision, high-speed optical transmission of a signal even if the signal has a high accurate timing, an indefinite period, and a DC component.

A third object of the present invention is to provide a semiconductor device tester which employs the above optical transmission system and method.

A fourth object of the present invention is to provide an optical pulse signal transmitting method which precludes the possibility of jitter being caused in the signal to be transmitted to the receiving side regardless of a temperature change.

A fifth object of the present invention is to provide an optical pulse detecting method which utilizes the above optical pulse signal transmitting method.

A sixth object of the present invention is to provide a transmission waveform converting method which prevents that the polarity inverting portion of an opposite-polarity pulse pair does not form a discontinuous edge.

A seventh object of the present invention is to provide a light intensity modulator which prevents that the polarity inverting portion of the opposite-polarity pulse pair does not form a discontinuous edge, and is high in timing accuracy.

An eighth object of the present invention is to provide an optical transmission system and a semiconductor device tester which employ the light intensity modulator.

According to a first aspect of the present invention, there is provided an optical transmission system comprising: in the transmitting side thereof, first edge detecting means and second edge detecting means for detecting a rise edge and a fall edge of a signal waveform to be transmitted, respectively; first transmitting pulse generating means for generating a first transmitting pulse signal constituted by a pair of opposite-polarity pulses, the opposite-polarity pulse pair inverting in their polarities at the point of the rise edge detection timing by the first edge detecting means; second transmitting pulse generating means for generating a second transmitting pulse signal constituted by a pair of opposite-polarity pulses, the opposite-polarity pulse pair inverting in their polarities at the point of the fall edge detection timing by the second edge detecting means; first light intensity modulation means for generating a first light intensity modulated signal based on the first transmitting pulse signal; and second light intensity modulation means for generating a second light intensity modulated signal based on the second transmitting pulse signal; and in the receiving side thereof, first AC-coupled receiving means for receiving the first light intensity modulated signal to obtain a first received signal consisting of only an AC component extracted from the first light intensity modulated signal; second AC-coupled receiving means for receiving the second light intensity modulated signal to obtain a second received signal consisting of only an AC component extracted from the second light intensity modulated signal; first discriminating means for discriminating the rise timing from the first received signal; second discriminating means for discriminating the fall timing from the second received signal; and signal regenerating means for regenerating the rise edge and fall edge relating to the signal waveform to be transmitted on the basis of the discriminated rise timing and the fall timing.

The first discriminating means discriminates, as the rise timing, a time point at which the polarity of the first received signal inverts, and the second discriminating means discriminates, as the fall timing, a time point at which the polarity of the second received signal inverts.

In addition, on the basis of a rise discrimination reference level serving as a reference for discrimination of the rise timing and a rise discrimination start level providing a timing for starting the discriminating operation of the rise timing, the first discriminating means is caused to be operative only during a fixed time interval starting at a time point when the rise edge of the first received signal intersects the rise discrimination start level, and discriminates, as the rise timing, a time point when the first received signal intersects the rise discrimination reference level during the first discriminating means is operative. On the basis of a fall discrimination reference level serving as a reference for discrimination of the fall timing and a fall discrimination start level providing a timing for starting the discriminating operation of the fall timing, the second discriminating means is caused to be operative only during a fixed time interval starting at a time point when the fall edge of the second received signal intersects the fall discrimination start level, and discriminates, as the fall timing, a time point when the second received signal intersects the fall discrimination reference level during the second discriminating means is operative.

The signal regenerating means is constituted by an asynchronous SR (set-reset) flip-flop circuit which is set by the rise timing discriminated by the first discriminating means and reset by the fall timing discriminated by the second discriminating means.

According to a second aspect of the present invention, there is provided an optical transmission system comprising: in the transmitting side thereof, first edge detecting means and second edge detecting means for detecting a rise edge and a fall edge of a signal waveform to be transmitted, respectively; first transmitting pulse generating means for generating a first transmitting pulse signal constituted by a pair of opposite-polarity pulses, the opposite-polarity pulse pair inverting in their polarities at the point of the rise edge detection timing by the first edge detecting means; second transmitting pulse generating means for generating a second transmitting pulse signal constituted by a pair of opposite-polarity pulses, the opposite-polarity pulse pair inverting in their polarities at the point of the fall edge detection timing by the second edge detecting means and having the inverted polarities of the first transmitting pulse signal; light intensity modulation means for generating a light intensity modulated signal based on the first transmitting pulse signal and the second transmitting pulse signal; and in the receiving side thereof, AC-coupled receiving means for receiving the light intensity modulated signal to obtain a received signal consisting of only an AC component extracted from the light intensity modulated signal; discriminating means for detecting, from the received signal, signals relating to the first and the second transmitting pulse signals as well as discriminating the rise timing and the fall timing on the basis of the relationship of their polarities inverted each other; and signal regenerating means for regenerating the rise edge and the fall edge relating to the signal waveform to be transmitted on the basis of the rise timing and the fall timing.

The discriminating means comprises: a first discrimination circuit for discriminating, as the rise timing, a time point when the polarity of that signal in the received signals which relates to the first transmitting pulse signal inverts from positive to negative; and a second discrimination circuit for discriminating, as the fall timing, a time point when the polarity of that signal in the received signals which relates to the second transmitting pulse signal inverts from negative to positive.

In addition, on the basis of a discrimination reference level serving as a reference for discrimination of a timing, a rise discrimination start level providing a timing for starting the discriminating operation of the rise timing, and a fall discrimination start level providing a timing for starting the discriminating operation of the fall timing, in case of discriminating the rise timing, the first discriminating means is caused to be enabled only during a fixed time interval from as well as the second discriminating means is caused to be disabled from a time point when the rise edge of the first received signal intersects the rise discrimination start level, and during the first discriminating means is enabled, a time point when the received signal intersects the discrimination reference level is discriminated as the rise timing. In case of discriminating the fall timing, the second discriminating means is caused to be enabled only during a fixed time interval from as well as the first discriminating means is caused to be disabled from a time point when the fall edge of the received signal intersects the fall discrimination start level, and during the second discriminating means is enabled, a time point when the received signal intersects the discrimination reference level is discriminated as the fall timing.

The signal regenerating means is constituted by an asynchronous SR flip-flop circuit which is set by the rise timing and reset by the fall timing discriminated by the discriminating means, respectively.

According to a third aspect of the present invention, there is provided a semiconductor device testing apparatus provided with the optical transmission system described in any one of claims 1 to 8 and in which a tester proper of the testing apparatus for transmitting a binary signal and a test head of the testing apparatus for receiving a binary signal are interconnected via an optical fiber and an optical transmission is effected between the tester proper and the test head using the optical transmission system.

According to a fourth aspect of the present invention, there is provided a method of transmitting an optical signal comprising: a transmitting step of detecting a rise edge and a fall edge of a signal waveform to be transmitted, respectively, and sending out onto an optical transmission line timing signals in each of which the detection timing of the edge forms the boundary for indicating a rise timing or a fall timing; and a receiving step of receiving the timing signals sent out onto the optical transmission line and regenerating a rise edge and a fall edge relating to the signal waveform to be transmitted on the basis of the rise timing and the fall timing of the received timing signals.

According to a fifth aspect of the present invention, there is provided a method of transmitting an optical signal comprising: a first step of detecting a rise edge and a fall edge of a signal waveform to be transmitted, respectively; a second step of generating a first transmitting pulse signal constituted by a pair of opposite-polarity pulses, the opposite-polarity pulse pair inverting in their polarities at the point of the rise edge detection timing as well as generating a second transmitting pulse signal constituted by a pair of opposite-polarity pulses, the opposite-polarity pulse pair inverting in their polarities at the point of the fall edge detection timing; a third step of generating a first light intensity modulated signal based on the first transmitting pulse signal and a second light intensity modulated signal based on the second transmitting pulse signal, and sending out these modulated signals separately onto an optical transmission line; a fourth step of receiving the first and the second light intensity modulated signals individually and obtaining first and second received signals consisting of only AC components respectively extracted from the first and the second light intensity modulated signals; and a fifth step of discriminating a rise timing from the first received signal as well as discriminating a fall timing from the second received signal, and regenerating a rise edge and a fall edge relating to the signal waveform to be transmitted on the basis of the rise timing and the fall timing thus discriminated.

The discrimination of the rise timing and the fall timing in the fifth step is performed by discriminating the time point at which the polarity of the first received signal inverts as the rise timing and the time point at which the polarity of the second received signal inverts as the fall timing.

In addition, in case of discriminating the rise timing, on the basis of a rise discrimination reference level serving as a reference for discrimination of a rise timing and a rise discrimination start level providing a timing for starting the discriminating operation of the rise timing, a time point when the first received signal intersects the rise discrimination reference level within a fixed time interval starting at a time point when the rise edge of the first received signal intersects the rise discrimination start level is discriminated as the rise timing. In case of discriminating the fall timing, on the basis of a fall discrimination reference level serving as a reference for discrimination of a fall timing and a fall discrimination start level providing a timing for starting the discriminating operation of the fall timing, a time point when the second received signal intersects the fall discrimination reference level within a fixed time interval starting at a time point when the fall edge of the second received signal intersects the fall discrimination start level is discriminated as the fall timing.

According to a sixth aspect of the present invention, there is provided a method of transmitting an optical signal comprising: a first step of detecting a rise edge and a fall edge from a signal waveform to be transmitted, respectively; a second step of generating a first transmitting pulse signal constituted by a pair of opposite-polarity pulses, the opposite-polarity pulse pair inverting in their polarities at the point of the rise edge detection timing as well as generating a second transmitting pulse signal constituted by a pair of opposite-polarity pulses, the opposite-polarity pulse pair inverting in their polarities at the point of the fall edge detection timing and having the inverted polarities of the first transmitting pulse signal; a third step of generating a light intensity modulated signal based on the first and the second transmitting pulse signals and sending out the modulated signal onto an optical transmission line; a fourth step of receiving the light intensity modulated signal to obtain a received signal consisting of only an AC component extracted from the light intensity modulated signal; and a fifth step of detecting, from the received signal, signals relating to the first and the second transmitting pulse signals as well as discriminating the rise timing and the fall timing on the basis of the relationship of their polarities inverted each other, and regenerating the rise edge and the fall edge relating to the signal waveform to be transmitted on the basis of the discriminated rise timing and the fall timing.

The discrimination of the rise timing and the fall timing in the fifth step is performed by discriminating, as the rise timing, a time point when the polarity of that signal in the received signals which relates to the first transmitting pulse signal inverts from positive to negative; and discriminating, as the fall timing, a time point when the polarity of that signal in the received signals which relates to the second transmitting pulse signal inverts from negative to positive.

In addition, on the basis of a discrimination reference level serving as a reference for discrimination of a timing, a rise discrimination start level providing a timing for starting the discriminating operation of the rise timing, and a fall discrimination start level providing a timing for starting the discriminating operation of the fall timing, in case of discriminating the rise timing, the rise timing discrimination is enabled only during a fixed time interval from as well as the fall timing discrimination is disabled from a time point when the rise edge of the received signal intersects the rise discrimination start level, and within the fixed time interval, a time point when the received signal intersects the discrimination reference level is discriminated as the rise timing. In case of discriminating the fall timing, the fall timing discrimination is enabled only during a fixed time interval from as well as the rise timing discrimination is disabled from a time point when the fall edge of the received signal intersects the fall discrimination start level, and within the fixed time interval, a time point when the received signal intersects the discrimination reference level is discriminated as the fall timing.

According to a seventh aspect of the present invention, there is provided an optical pulse transmitting method in which an electric pulse is applied to a light emitting device provided at the transmitting side, thereby emitting an optical pulse from the light emitting device, which is, in turn, transmitted to the receiving side over an optical transmission line, and the transmitted optical pulse is converted into an electric pulse by a light receiving device provided at the receiving side, which is acquired as a received signal, and the method is characterized in that: in the transmitting side, a symmetrical waveform signal which changes symmetrically in positive side and in negative side with a DC bias current value as its center is applied as the electric pulse to the light emitting device, thereby maintaining the mean value of light on the optical transmission line in a constant value.

In the above optical pulse transmitting method according to the seventh aspect of the invention, the point of detection of the symmetrical waveform signal received at the receiving side is defined to a zero-crossing point where the signal intersects the DC bias current.

According to an eighth aspect of the present invention, there is provided an optical pulse transmitting method in which an electric pulse is applied to a light emitting device provided at the transmitting side, thereby emitting an optical pulse from the light emitting device, which is, in turn, transmitted to the receiving side over an optical transmission line, and the transmitted optical pulse is converted into an electric pulse by a light receiving device provided at the receiving side, which is acquired as a received signal, and the method is characterized in that: in the transmitting side, a symmetrical waveform signal which changes symmetrically in positive side and negative side with a DC bias current value as its center at each of the leading edge and the trailing edge of the symmetrical waveform signal is applied as the electric pulse to the light emitting device, thereby maintaining the mean value of light on the optical transmission line in a constant value even if a pulse having long pulse width in time is transmitted over the optical transmission line.

In the above optical pulse transmitting method according to the eighth aspect of the invention, the detection point of reception at the receiving side is defined by the zero-crossing point of either one of symmetrical waveform signals which are generated at the leading edge and the trailing edge thereof.

In addition, a smoothing circuit is provided at the receiving side for generating a DC voltage corresponding to the DC bias current value, and the DC voltage generated from the smoothing circuit is applied to a voltage comparator as a reference voltage thereof, the voltage comparator having a hysteresis characteristic, and then a potential variation that exceeds the hysteresis width of the hysteresis characteristic with the reference voltage as its center is detected as the received signal and outputted from the voltage comparator.

According to a ninth aspect of the present invention, there is provided a method of converting a digital input signal to a transmitting waveform constituted by a pair of opposite-polarity pulses, the opposite-polarity pulse pair inverting in their polarities at a timing of the rise or the fall of the digital input signal, and the method is characterized by the steps of: generating a first waveform having the same waveform as that of the input signal, a second waveform delayed by a fixed time interval from the first waveform and having its amplitude as large as twice that of the first waveform, the waveform of the second waveform having logically negative relationship with respect to the digital input signal, and a third waveform delayed by a fixed time interval from the second waveform and having the same waveform as that of the first waveform, from the digital input signal; and superimposing the first, the second and the third waveforms to create the opposite-polarity pulse pair.

According to a tenth aspect of the present invention, there is provided a light intensity modulating apparatus which comprises light emitting means and driving means for driving the light emitting means in accordance with a digital input signal, and the driving means comprises: first current switching means for forming a first current waveform which has the same waveform as that of the digital input signal; second current switching means for forming a second current waveform which is delayed by a fixed time interval from the first current waveform and having its amplitude as large as twice that of the first current waveform, the waveform of the second current waveform having logically negative relationship with respect to the digital input signal; and third current switching means for forming a third current waveform which is delayed by a fixed time interval from the second current waveform and having the same waveform as that of the first current waveform, and wherein the driving means drives the light emitting means by a current waveform obtained by adding together the first, the second and the third current waveforms.

Each of the first to third current switching means comprises a first transistor having its base connected to an inverted input terminal to which the inversion of the digital input signal is applied, and a second transistor having its base connected to an input terminal to which the digital input signal is applied, and the emitters of the first and the second transistors of each current switching means are connected in common to a current source, the collectors of the first transistors constituting the first and the third current switching means and the collector of the second transistor constituting the second current switching means are connected in common to a power supply line to form a first output, the collectors of the second transistors constituting the first and the third current switching means and the collector of the first transistor constituting the second current switching means are connected in common to form a second output, and the current source for the second current switching means is adapted to supply a current as large as twice that of the remaining current sources for the remaining current switching means.

In addition, the second current switching means has a first delay circuit in the input line to the collector of its first transistor and a second delay circuit in the input line to the collector of its second transistor, and the third current switching means has a series combination of the first delay circuit and a third delay circuit in the input line to the collector of its first transistor and a series combination of the second delay circuit and a fourth delay circuit in the input line to the collector of its second transistor.

Further, each of the current sources for the first to third current switching means has a current regulating resistor, and the resistance values of these current regulating resistors are set such that the resistance values of the current regulating resistors of the current sources for the first and the third current switching means are equal to each other, and the resistance value of the current regulating resistor of the current source for the second current switching means is one half of the resistance value of the current regulating resistor of the current source for each of the first and the third current switching means.

According to an eleventh aspect of the present invention, there is provided an optical transmission system comprising: in the transmitting side thereof, the light intensity modulating apparatus set forth in any one of claims 23 to 26; and in the receiving side thereof, AC-coupled receiving means for receiving a signal modulated in light intensity by the light intensity modulating apparatus to obtain a received signal consisting of only an AC component extracted from the light intensity modulated signal; and signal regenerating means for regenerating, from the received signal, the rise timing and the fall timing of the digital input signal before transmitted to the receiving side on the basis of the relationship of their polarities inverted each other.

According to a twelfth aspect of the present invention, there is provided a semiconductor device testing apparatus in which a tester proper and a test head are interconnected with each other via an optical fiber, and comprising: in the tester proper side, the light intensity modulating apparatus set forth in any one of claims 23 to 26; and in the test head side, AC-coupled receiving means for receiving a signal modulated in light intensity by the light intensity modulating apparatus to obtain a received signal consisting of only an AC component extracted from the light intensity modulated signal; and signal regenerating means for regenerating, from the received signal, the rise timing and the fall timing of the digital input signal before transmitted to the receiving side on the basis of the relationship of their polarities inverted each other.

According to a thirteenth aspect of the present invention, there is provided a semiconductor device testing apparatus in which a tester proper and a test head are interconnected with each other via an optical fiber, and comprising: in the test head side, the light intensity modulating apparatus set forth in any one of claims 23 to 26; and in the tester proper side, AC-coupled receiving means for receiving a signal modulated in light intensity by the light intensity modulating apparatus to obtain a received signal consisting of only an AC component extracted from the light intensity modulated signal; and signal regenerating means for regenerating, from the received signal, the rise timing and the fall timing of the digital input signal before transmitted to the receiving side on the basis of the relationship of their polarities inverted each other.

In the present invention a bias current, which is constant even during no-signal period and has a value larger than the threshold value that provides a light emission starting point of the light emitting device, is applied thereto, driving it to emit a fixed quantity of light at all times. The invention proposes an optical pulse transmitting method according to which the pulse intended to send is added with a pulse opposite in polarity thereto to generate a symmetrical waveform signal which goes positive and negative symmetrically about the bias current and the symmetrical waveform signal is used to drive the light emitting device.

Furthermore, the present invention proposes an optical pulse detecting method according to which the receiving side utilizes, as a signal detection threshold value, a voltage corresponding to the bias current sent from the transmitting side.

Hence, with the use of the optical pulse transmitting method and optical pulse detecting method according to the present invention, even if the injected current vs. output light power characteristic of the light emitting device changes due to a temperature variation at the transmitting side, the bias current flowing across the light emitting device varies accordingly and the variation of the bias current is transmitted as a DC component of light to the receiving side.

Since the receiving side has a construction which regenerates the DC component of light transmitted thereto as a bias voltage and applies it as a reference voltage to a voltage comparator having a hysteresis characteristic to thereby detect rise and fall transition points of the symmetrical waveform signal, the point of detection of the symmetrical waveform signal will not change in time even if the bias voltage varies.

Thus, according to the present invention, even in the case where the light emitting device at the transmitting side undergoes a temperature change and its injected current vs. output light power characteristic varies accordingly, the point of detection of the pulse at the receiving side does not change. That is, it is possible to prevent the generation of jitter. Hence, the application of the present invention to a device of the type transmitting data over the multi channel transmission line provides an advantage that no timing error occurs in signals between the respective channels, ensuring properly timed data transmission and reception.

BRIEF DESCRIPTION OF THE DRAWINGS

FIG. 10 is a circuit diagram showing a concrete example of an optical pulse transmitter according to a third embodiment of the present invention.

FIG. 11 is timing chart for explaining the operation of the optical pulse transmitter shown in FIG. 10.

BEST MODE FOR CARRYING OUT THE INVENTION

With reference to the accompanying drawings, embodiments of the present invention will hereinafter be described in detail.

Figure 1:
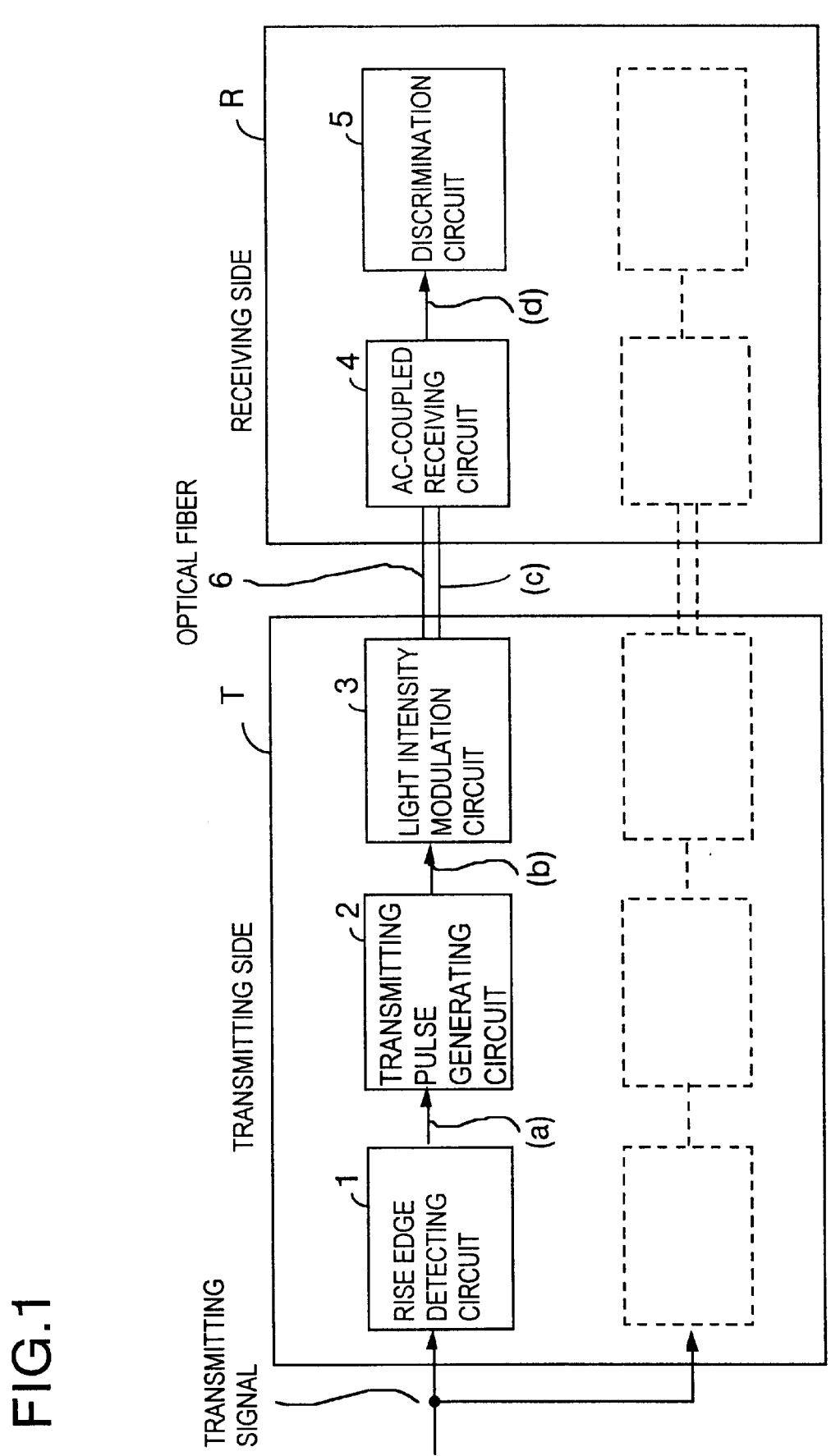
FIG. 1 is a block diagram illustrating the general configuration of an optical signal transmission system according a first embodiment of the present invention.

FIG. 1 is a block diagram schematically illustrates the configuration of a first embodiment of an optical signal transmission system according to the present invention. The optical transmission system is made up of a transmitting side T, the receiving side R and an optical fiber 6 that interconnects the both sides T and R.

The transmitting side T comprises a rise edge detecting circuit 1, a transmitting pulse generating circuit 2 and a light intensity modulation circuit 3, and the receiving side R comprises an AC-coupled receiving circuit 4 and a discrimination circuit 5.

The signal that is transmitted in this optical signal transmission system is not binary data but a timing signal which indicates a point in time when the rise edge of the waveform of a binary signal, that is, the amplitude value (level) of the rise of the transmitting signal exceeds a predetermined amplitude value (level). For brevity sake, the FIG. 1 embodiment is shown to have a circuit configuration for transmitting only the rise edge of the binary signal waveform, but in practice, it includes a similar circuit configuration for transmitting the fall edge of the waveform of the binary signal as indicated by the broken lines; that is, the optical signal transmission system has two circuit arrangements for transmitting the leading and fall edges of the binary signal waveform, respectively.

Figure 2:
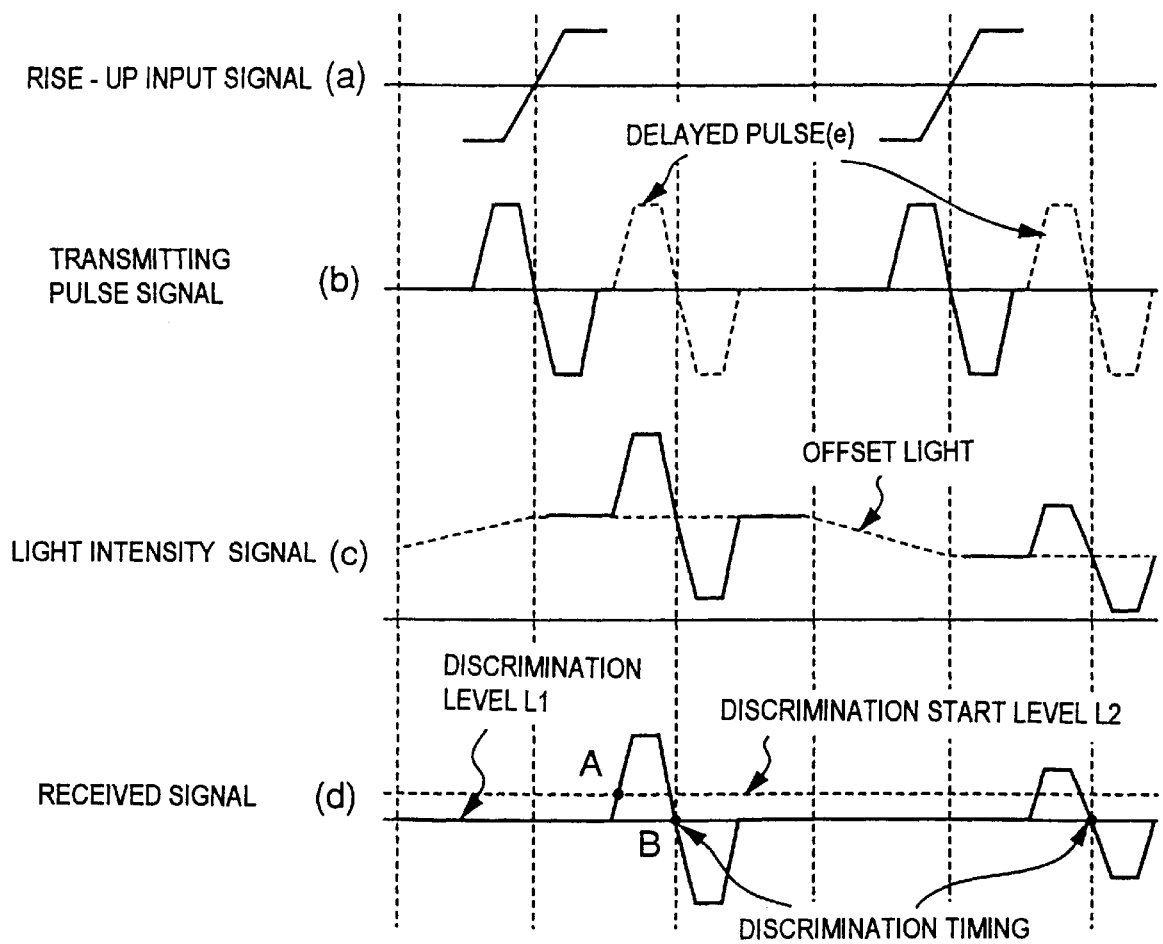
FIG. 2 is a diagram for explaining the operation of the circuits depicted in FIG. 1.

FIG. 2 is a timing chart for explaining the operations of various circuits depicted in FIG. 1; the timing chart shows waveforms, for example, in the case of detecting the rise edge of the waveform (timing when the amplitude value of the rise edge exceeds 50%) and transmitting it. With reference to FIG. 2, the operation of each circuit will hereinafter be described concretely.

The rise edge detecting circuit 1 is usually formed by a logic circuit or the like, which detects the rise edge (timing) of a transmitting waveform (which means the waveform of the signal to be transmitted) and generates a rise signal (a).

Based on the timing of the rise signal from the rise edge detecting circuit 1, the transmitting pulse generating circuit 2 generates in succession the corresponding positive pulse signal and a negative pulse signal opposite in polarity thereto to generate a pair of pulses having reversed their polarity at the rise timing, which is output as a transmitting pulse signal (b).

It is necessary to use, as the transmitting pulse signal (b), a pulse signal whose waveform and pulse width are sufficiently smaller than the minimum pulse interval of the waveform of the original transmitting signal. In other words, the pulse width of the transmitting pulse signal (b) defines the minimum pulse interval of the waveform of the original transmitting signal. Incidentally, even when the transmitting pulse signal (b) becomes such a delayed pulse (e) as indicated by the broken lines due to some delay in its generation, it can be used as a timing signal at the receiving side without difficulty if the delay is always a fixed and known value.

The light intensity modulation circuit 3 is driven based on the transmitting pulse signal from the transmitting pulse generating circuit 2; that is, a light emitting device (not shown) is driven by a conventional modulation method which modulates the light intensity of offset light, outputting as a light intensity signal (c) a pair of optical pulses that have reversed their polarity at the timing when the amplitude value of the rise edge of the transmitting pulse signal waveform exceeds a predetermined value. The light intensity signal (c) is sent over the optical fiber 6 to the receiving side R.

The AC-coupled receiving circuit 4 is a circuit that detects the received light intensity signal (c) by the conventional AC-coupling method, by which is detected such a received signal as shown at the bottom of FIG. 2. In this instance, since the received light intensity signal (c) is an optical pulse signal modulated based on the transmitting pulse signal (b) that reverses its polarity at the rise timing, it has always opposite-polarity pulses. Hence, there is no possibility that the received signal (d) to be detected contains many pulses inclining toward one particular polarity.

The discrimination circuit 5 discriminates, from the received signal (d) detected by the AC-coupled receiving circuit 4, the rise edge (timing of the received signal exceeding a predetermined amplitude value). To discriminate the rise timing, the following operation is performed based on a threshold level L1 (see FIG. 2) with reference to which the timing discrimination is made, and a discrimination starting level L2 (see FIG. 2) which is preset at a level low enough to permit separation of noise and signal and provides the timing for the initiation of the discriminating operation.

At the instant A when the rise edge of the received signal (d) crosses the discrimination starting level L2, the discrimination circuit 5 is instantaneously activated, which generates a timing pulse upon discrimination of the instant B when the received signal crosses the threshold level L1 within a fixed delay time. That is, the discrimination circuit 5 remains operative only by a time interval substantially corresponding to the pulse width after the instant A of the rise edge having crossed the discrimination starting level L2, and determines the instant B of the received signal (d) having crossed the threshold level L1 as discrimination timing, generating the timing pulse. With this discriminating operation, since the discrimination circuit 5 does not operate when no pulse is present, it will not erroneously discriminate a low-level fluctuation due to noise as a pulse.

Incidentally, since it is evident that the operation of discriminating the fall edge from the received signal (d) can similarly be performed, no description will be given thereof.

In the optical signal transmission system of the above configuration, the rise edge can be reproduced by using the timing pulse (the rise-sup timing) available from the rise edge discrimination circuit, for example, as a set signal of an asynchronous RS (set-reset) flip-flop circuit, and the fall edge can be reproduced by similarly using the timing pulse (the fall timing) from the fall edge discrimination circuit as a reset signal of the flip-flop circuit. Hence, these reproduced edges can be used to regenerate the original binary transmitting signal waveform.

As described above, according to the first embodiment, the rise and fall timing of the signal waveform to be transmitted are handled separately of each other, then based on the respective timing, a transmitting pulse signal is generated which is composed of a pair of opposite-polarity pulses that reverse their polarity at each timing, then the transmitting pulse signal is used to intensity-modulate offset light, and the opposite-polarity optical pulse pair is transmitted as a light intensity signal to the receiving side. The receiving side receives the transmitted light-intensity signal by the AC-coupled receiving circuit, and only in the presence of the pulse, actuates the discrimination circuit to detect the rise and fall discrimination timing, the electrically reproduce the original transmitting signal waveform from the rise and fall timing signals available from the discrimination circuit.

Accordingly, even in the case where many different periods are mixed and the binary data to be transmitted heavily inclines toward one particular value (0 or 1) as in the case of data transmission between the tester proper and the test head of a semiconductor device tester, it is possible to perform high-speed, high-accuracy optical transmission by transmitting the rise and the fall timing of the signal waveform separately of each other.

Next, a description will be given of a concrete circuit arrangement for implementing the optical signal transmission system described above. It must be noted here that the circuit arrangement described below is intended as being merely illustrative of the circuit configuration for implementing this transmission system and not as limiting the invention.

Figure 3:
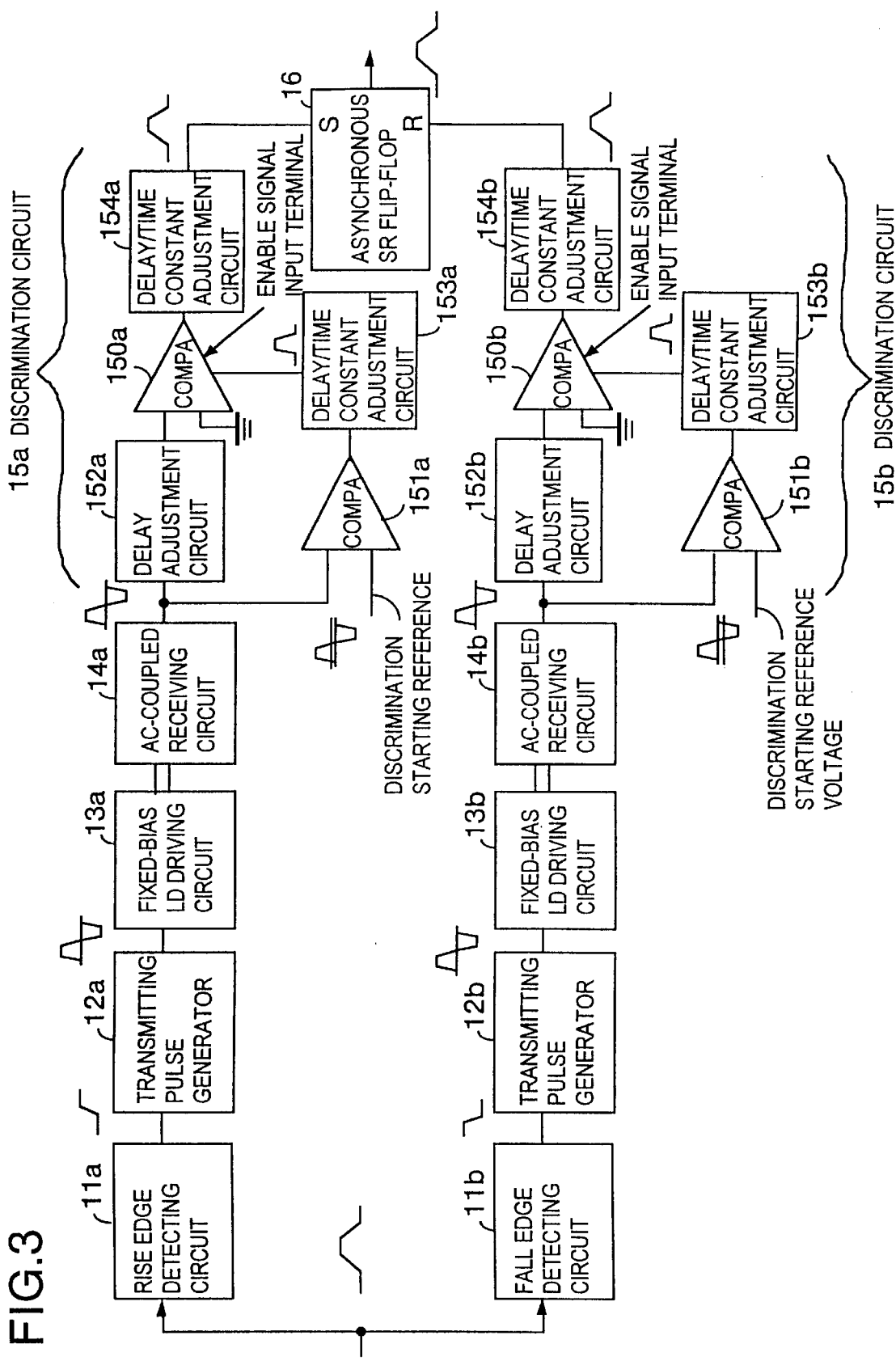
FIG. 3 is a block diagram depicting an example of a concrete circuit configuration of the optical signal transmission system shown in FIG. 1.

FIG. 3 illustrates in block form an example of a concrete circuit configuration of the optical signal transmission system depicted in FIG. 1. The transmitting side T is provided with: a first transmission circuit (a rise edge transmission circuit) made up of a rise edge detecting circuit 11a, a transmitting pulse generator 12a and a fixed-bias LD driving circuit 13a; and a second transmission circuit (fall edge transmission circuit) made up of a fall edge detecting circuit 11b, a transmitting pulse generator 12b and a fixed-bias LD driving circuit 13b. The receiving side R is provided with: a first receiving circuit (a rise edge receiving circuit) made up of an AC-coupled receiving circuit 14a for receiving an optical signal transmitted over an optical fiber from the first transmitting circuit and a discrimination circuit 15a for detecting the rise timing from the AC component of the received signal available from the AC-coupled receiving circuit 14b; and a second receiving circuit (a fall edge receiving circuit) made up of an AC-coupled receiving circuit 14b for receiving an optical signal transmitted over an optical fiber from the second transmitting circuit and a discrimination circuit 15b for detecting the fall timing from the AC component of the received signal available from the AC-coupled receiving circuit 14b. An asynchronous RS flip-flop 16 is provided which is set by the output from the discrimination circuit 15a and reset by the output from the discrimination circuit 15b.

The leading and fall edge detecting circuits 11a and 11b, the transmitting pulse generators 12a and 12b, and the AC-coupled receiving circuits 14a and 14b are identical in construction and in operation with the corresponding circuits depicted in FIG. 1, and hence no description will be repeated.

The fixed-bias LD driving circuits 13a and 13b at the receiving side are circuits that drive a laser diode (not shown) used as a light emitting device; they drive the laser diode using, as driving signals, pairs of pulses which are available from the transmitting pulse generators 12a and 12b and reverse their polarity relative to each other at the rise and the fall timing, thereby generating a light-intensity modulated signal. For the generation of the light-intensity modulated signal by the fixed-bias LD driving circuits 13a and 13b, a conventional method is employed which previously applies a bias current to the laser diode to cause it to emit light (offset light) and modulates the driving current of the laser diode in accordance with the driving signals.

The discrimination circuit 15a comprises a comparator 150a for timing discrimination use, a comparator 151a for determining whether or not to operate the comparator 150a, a delay adjustment circuit 152a and delay/time constant adjustment circuits 153a and 154a. Similarly, the discrimination circuit 15b comprises a comparator 150 for timing discrimination use, a comparator 151b for determining whether or not to operate the comparator 150b, a delay adjustment circuit 152b and delay/time constant adjustment circuits 153b and 154b. Since the discrimination circuits 15a and 15b are common in circuit configuration with each other, the following description will be given only of the discrimination circuit 15a, omitting a description of the discrimination circuit 15b.

In the discrimination circuit 15a, the output from the AC-coupled receiving circuit 14a is branched to one input terminal of the comparator 151a and to one input terminal of the comparator 150a via the delay adjustment circuit 152a. The comparator 151a receives at the other input terminal a discrimination start reference voltage, and compares it with an input voltage from the AC-coupled receiving circuit 14a, determining whether or not to operate the comparator 150a. The output from the comparator 151a is fed via the delay/time constant adjustment circuit 153a to an enable signal input terminal of the comparator 150a to control its operation.

The comparator 150a has its other input terminal grounded, and compares the ground potential and the input voltage fed via the delay adjustment circuit 152a from the AC-coupled receiving circuit 14a, detecting the rise timing. The output from the comparator 150a is input via the delay/time constant adjustment circuit 154a into an S (Set) terminal of the asynchronous RS flip-flop 16. Though not described, the asynchronous RS flip-flop 16 is supplied at its R (Reset) terminal with the output from the comparator 150b of the discrimination circuit 15b via the delay/time constant adjustment circuit 154b.

Next, a description will be made of the operation of the optical signal transmission system that has the circuit configuration depicted in FIG. 3. Upon input of a binary digital signal waveform (a transmitting signal waveform) into the leading and fall edge detecting circuits 11a and 11b, the rise edge detecting circuit 11a detects the rise edge of the input transmitting signal waveform and the fall edge detecting circuit 11b the fall edge of the input transmitting signal waveform.

The rise edge of the transmitting signal waveform detected by the rise edge detecting circuit 11a is provided to the transmitting pulse generator 12a, which generates a pair of pulses that reverse their polarity relative to each other at the timing of the input rise edge. Similarly, the transmitting pulse generator 12b generates a pair of pulses that reverse their polarity relative to each other at the timing of the input fall edge.

The fixed-bias LD driving circuit 13a drives the laser diode using, as its driving signal, the opposite-polarity pulse pair supplied from the transmitting pulse generator 12a. By this, the laser diode driving current is modulated according to the driving signal, causing the laser diode to generate a light intensity modulated signal. Likewise, the fixed-bias LD driving circuit 13b drives the laser diode using, as its driving signal, the opposite-polarity pulse pair supplied from the transmitting pulse generator 12b. By this, the laser diode driving current is modulated according to the driving signal, causing the laser diode to generate a light intensity modulated signal.

The light intensity modulated signals available from the laser diode, which correspond to its driving by the fixed-bias LD driving circuits 13a and 13b, are sent over the optical fibers to the transmitting side, wherein they are received by the corresponding AC-coupled receiving circuits 14a and 14b, respectively.

Upon receiving the light intensity modulated signal, the AC-coupled receiving circuits 14a and 14b each convert only the AC component of the received light intensity modulated signal into an electric signal. By this, the original opposite-polarity pulse pair is generated, which is output as the received signal. The received signals from the AC-coupled receiving circuits 14a and 14b are input into the discrimination circuits 15a and 15b.

The received signal input into the discrimination circuit 15a is fed first to the comparator 151a. The comparator 151a compares the voltage of the input received signal and the discrimination start reference voltage, thereby detecting the input of a pulse and outputting a pulse-like signal. The pulse-like output signal is processed by the delay/time constant adjustment circuit 153a into a signal of a sufficient pulse width, which is applied to the enable signal input terminal of the comparator 150a. Supplied with the enable signal, the comparator 150a starts its operation, then discriminates the center portion of the opposite-polarity pulse pair (the received signal), that is, the timing of its reversal of polarity, and outputs a pulse-like signal (a timing signal) indicating the discriminated timing.

In the discrimination circuit 15a, the delay times of the opposite-polarity pulse pair (the received signal) by the input paths to the comparators 150a and 151a are adjusted by the delay adjustment circuit 152a and the delay/time constant adjustment circuit 153a so that the comparator 151a starts its operation earlier than the arrival of the opposite-polarity pulse pair (the received signal) at the one input terminal of the comparator 150a.

The timing signal output from the comparator 150a is processed by the delay/time constant adjustment circuit 154a into a signal of a sufficient pulse width, which is input into the S (Set) terminal of the asynchronous RS flip-flop 16.

As is the case with the above, the received signal fed into the discrimination circuit 15b is applied to the comparator 151b. The comparator 151b compares the voltage of the input received signal and the discrimination start reference voltage, thereby detecting the input of a pulse and outputting a pulse-like signal. The pulse-like output signal is processed by the delay/time constant adjustment circuit 153b into a signal of a sufficient pulse width, which is applied to the enable signal input terminal of the comparator 150b. Supplied with the enable signal, the comparator 150b starts its operation, then discriminates the center position of the opposite-polarity pulse pair (the received signal), that is, the timing of the reversal of polarity, and outputs a pulse-like signal indicating the discriminated timing (a timing signal).

In the discrimination circuit 15b, the delay times of the opposite-polarity pulse pair (the received signal) by the input paths to the comparators 150b and 151b are adjusted by the delay adjustment circuit 152b and the delay/time constant adjustment circuit 153b so that the comparator 151b starts its operation prior to the arrival of the opposite-polarity pulse pair (the received signal) at the one input terminal of the comparator 150b.

The timing signal output from the comparator 150b is processed by the delay/time constant adjustment circuit 154b into a signal of a sufficient pulse width, which is input into the R (Reset) terminal of the asynchronous RS flip-flop 16.

When thus supplied with the set signal and the reset signal from the discrimination circuits 15a and 15b, the asynchronous RS flip-flop 16 responds to the input thereto of the set signal to go to the logic "1" state to thereby reproduce the rise edge of the original transmitting signal waveform, and responds to the input thereto of the reset signal to go to the logic "0" state to thereby reproduce the fall edge of the original transmitting signal waveform. This circuit compensates for an unnecessary time difference between the two transmission and processing lines for the rise edge timing and the fall edge timing transmission by the delay/time constant adjustment circuits 154a and 154b—this ensures that the transmitting signal waveform reproduced by the asynchronous RS flip-flop 16 becomes the binary signal of the same polarity and timing as those of the signal prior to its transmission.

Figure 4:
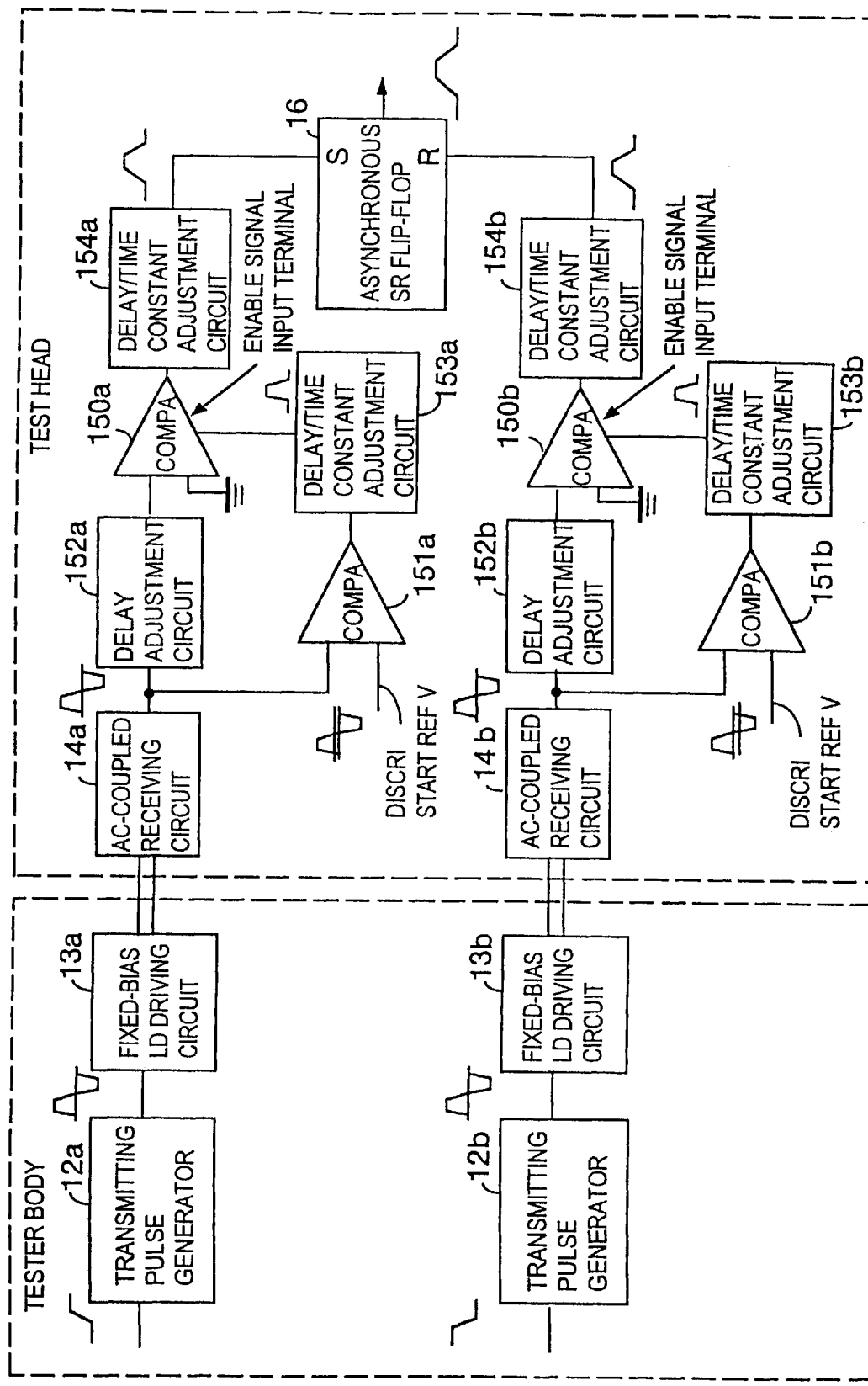
FIG. 4 is a block diagram depicting the general configuration of a semiconductor device tester utilizing the optical signal transmission system according to the first embodiment of the present invention.
Figure 5:
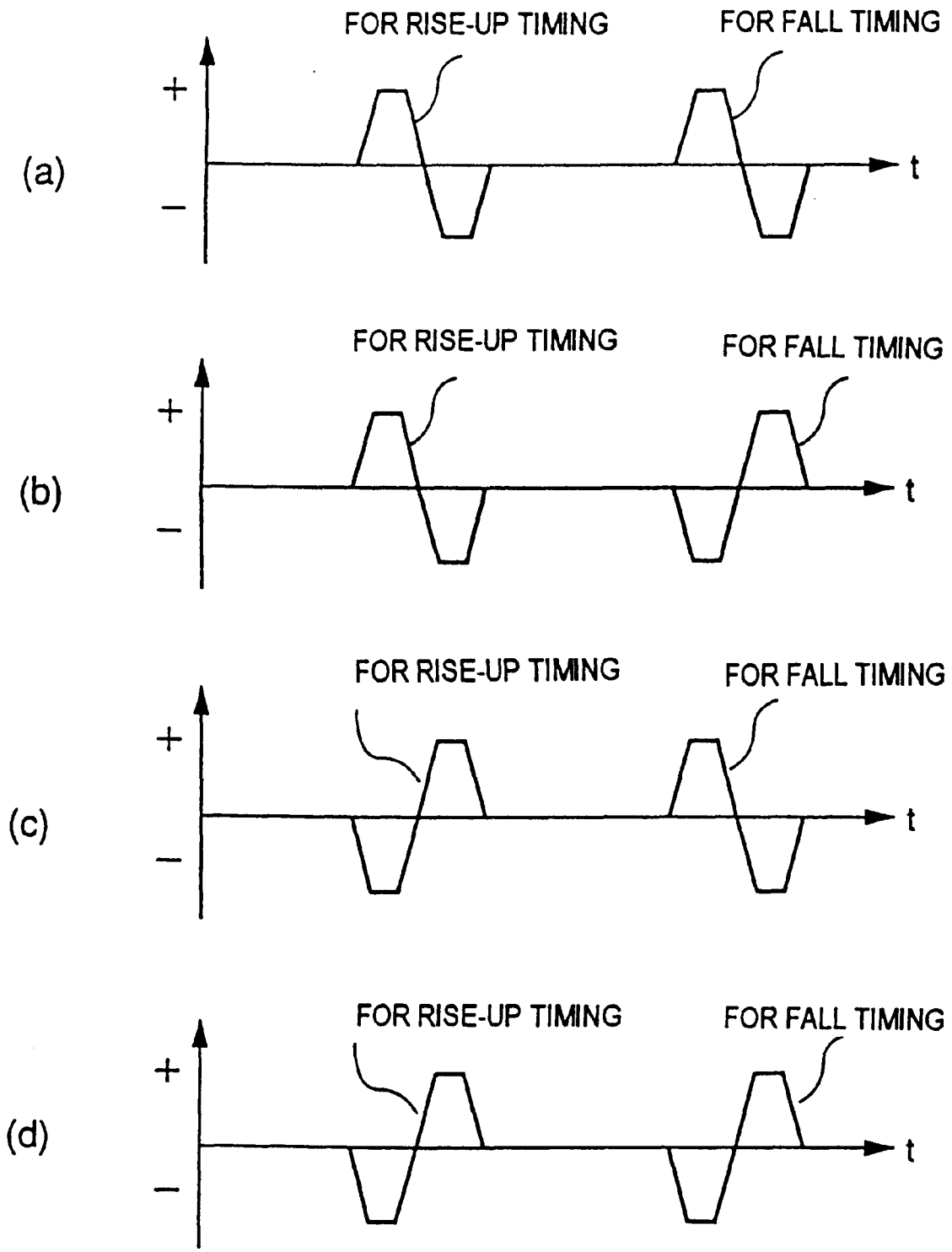
FIGS. 5(a) to (d) are waveform diagrams showing some examples of pairs of pulses which reverse their polarity at rise and fall timings.

The circuit configuration of the optical signal transmission system described above is applicable to a semiconductor device tester as well. Turning next to FIGS. 4 and 5, a semiconductor device tester using the optical signal transmission system of the above circuit configuration will be described concretely.

As depicted in FIG. 4, the tester proper has a transmitting part composed of the leading and fall edge detecting circuits 11a and 11b (not shown), the transmitting pulse generators 12a and 12b and the fixed bias LD driving circuits 14a and 14b, and the test head has a receiving part composed of the AC-coupled receiving circuits 14a and 14b, the discrimination circuits 15a and 15b and the asynchronous RS flip-flop 16. The transmitting part and the receiving part are interconnected using optical fibers.

With this arrangement, a signal in which many periods are mixed and the binary data to be sent heavily inclines toward one particular value (0 or 1)—which is transmitted between the tester proper and the test head of the semiconductor device tester—is transmitted from the transmitting part after conversion to transmitting pulse signals composed of opposite-polarity pulse pairs which indicate the timing at which only the leading and fall edges of the signal waveform cross the predetermined levels, and the receiving part electrically reproduces the original transmitting signal waveform from the discriminated rise and fall timing; hence, the original signal can be regenerated without causing polarity and timing errors.

In the semiconductor device tester, since the binary signal available in the tester proper is divided into the leading and fall edges, it is possible to omit the leading and fall edge detecting circuits 11a and 11b as not shown in FIG. 4, permitting reduction of the cost of the entire system.

In the optical signal transmission system of the first embodiment described above, the opposite-polarity pulse pairs indicative of the timing at which the leading and fall edges of the transmitting signal waveform cross the predetermined levels are not limited specifically to the pulse pairs described above and shown. For example, the rise timing pulse pair and the fall timing pulse pair may be those whose polarity bear such relationships as depicted in FIGS. 5(a) to (d). Incidentally, FIG. 5(a) shows the same opposite-polarity pulse pairs as those used in the first embodiment described above.

In the optical signal transmission system of the first embodiment described above, the rise and the fall timing of the signal waveform desired to transmit are handled separately and two transmission paths are provided over which to transmit the opposite-polarity pulse pairs indicating the rise and the fall timing, respectively, but the transmission paths between the transmitting and the receiving side can be reduced to one by making provision to enable such opposite-polarity pulse pairs to be discriminated as pulse pairs that are opposite in polarity to each other as shown in FIGS. 5(b) and ©.

Figure 6:
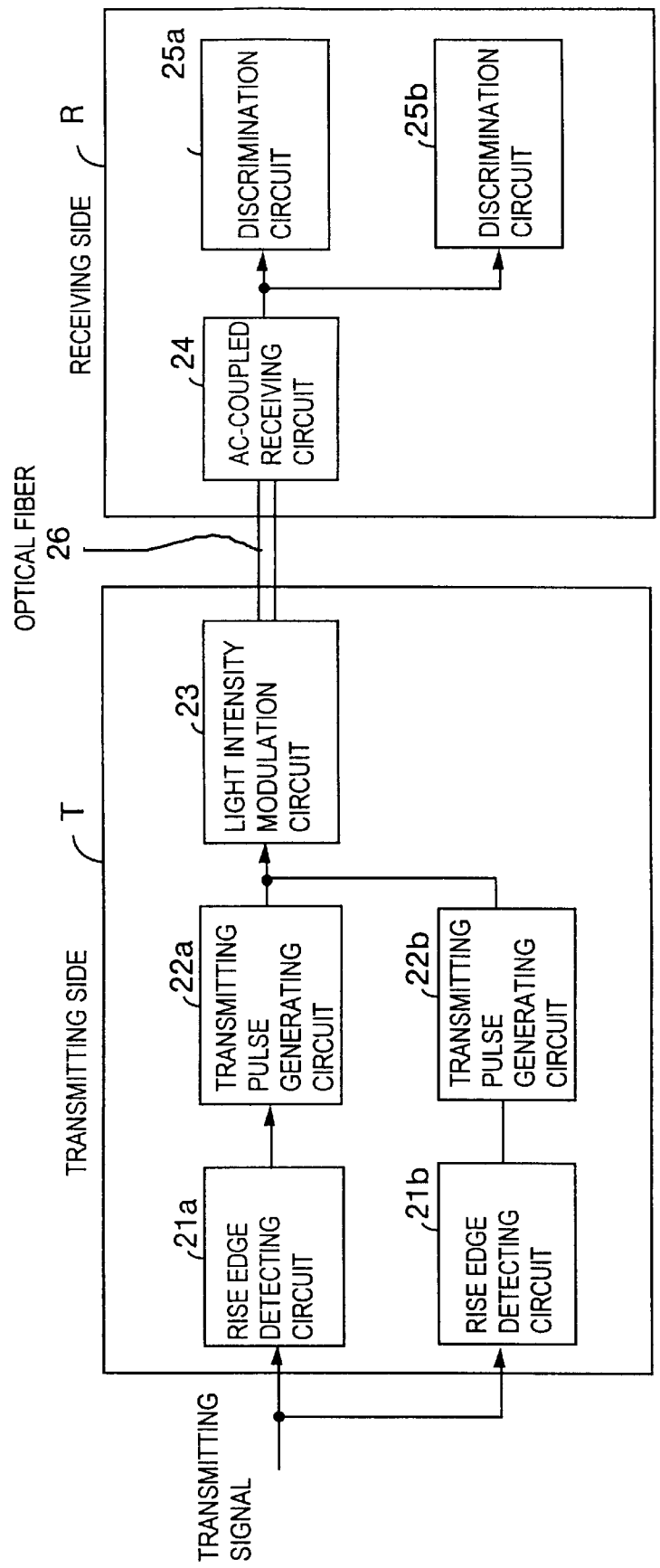
FIG. 6 is a block diagram illustrating the general configuration of an optical signal transmission system according to a second embodiment of the present invention.
Figure 7:
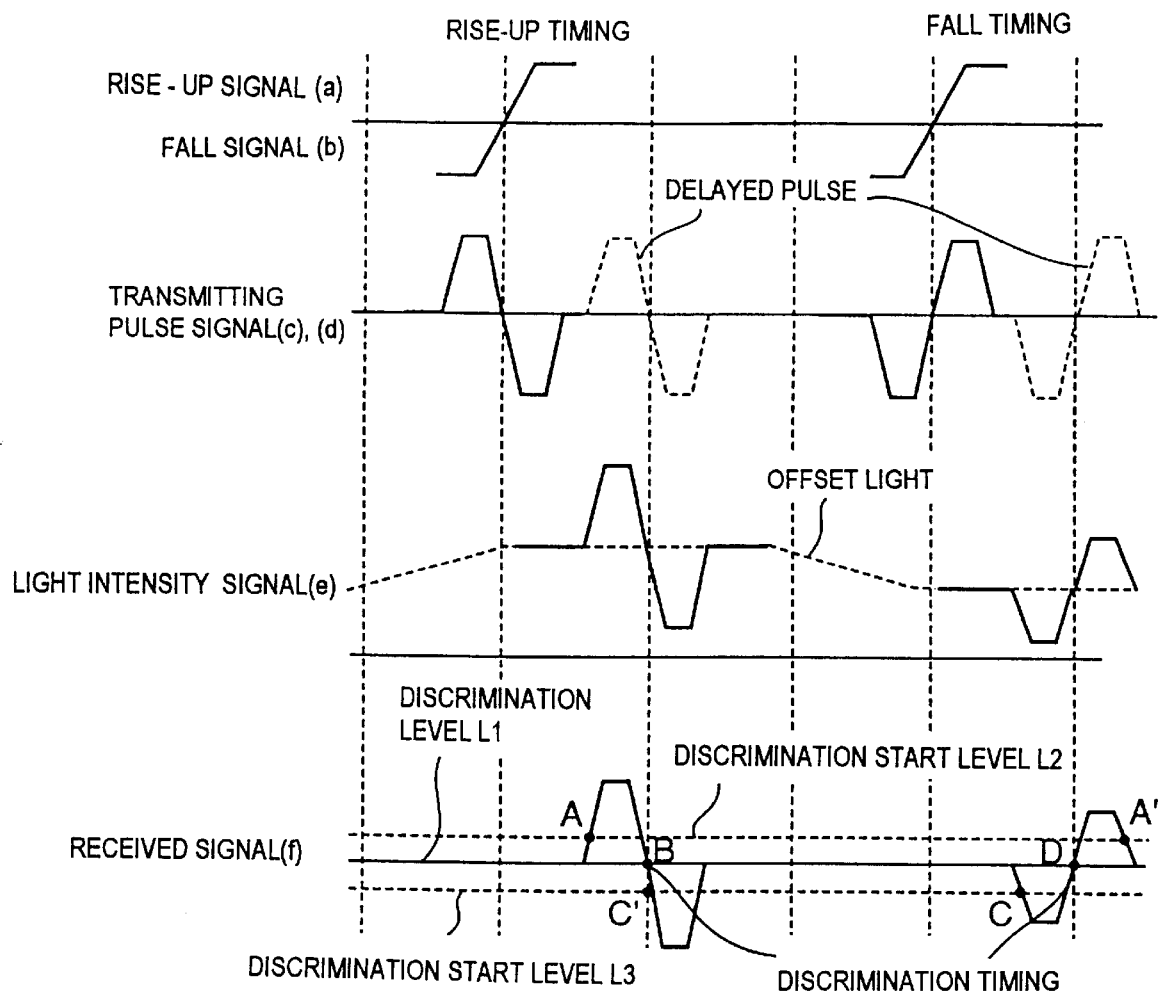
FIG. 7 is a waveform for explaining the circuit operation of the optical signal transmission system depicted in FIG. 6.
Figure 8:
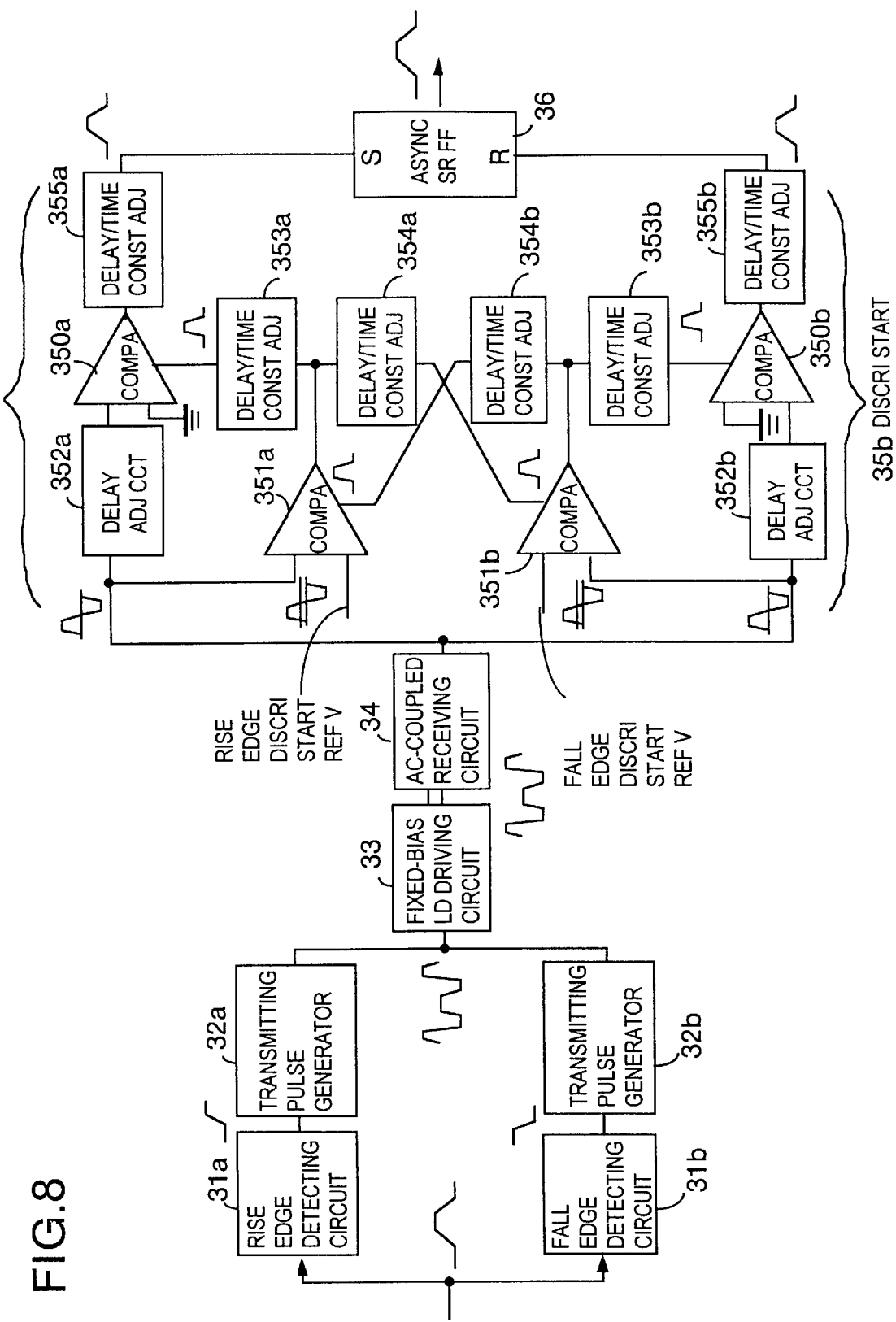
FIG. 8 is a block diagram depicted an example of a concrete circuit configuration of the optical signal transmission system depicted in FIG. 6.

Referring now to FIGS. 6 to 8, an optical signal transmission system according to a second embodiment of the present invention will be described which employs one transmission line between the transmitting and the receiving side.

FIG. 6 illustrates in block form a general configuration of the optical signal transmission system which employs one transmission line according to the second embodiment of the present invention. The optical signal transmission system of this embodiment has a configuration in which the transmitting side T is provided with leading and fall edge detecting circuits 21a and 21b, transmitting pulse generators 22a and 22b and a light intensity modulation circuit 23, and the receiving side R is provided with an AC-coupled receiving circuit 24 and discrimination circuits 25a and 25b. The transmitting side T and the receiving side R are interconnected via one optical fiber 26.

The optical signal transmission system of the above configuration basically common in operation to the system of the first embodiment except the opposite-polarity pulse pair generating operations by the transmitting pulse generators 22a and 22b and the rise and fall timing detecting operations by the discrimination circuits 25a and 25b.

FIG. 7 is a waveform diagram for explaining the operation of the optical signal transmission system depicted in FIG. 6. Referring next to FIG. 7, the operation of each circuit will be described concretely.

The transmitting pulse generators 22a and 22b generate transmitting pulse signals (c) and (d) composed of pulse pairs that reverse their polarity at the timing of rise and fall signals (a) and (b) which are detected by the leading and fall edge detecting circuits 21a and 21b, respectively. In this embodiment, the transmitting pulse signal (c) available from the transmitting pulse generator 22a and the transmitting pulse signal (d) from the transmitting pulse generator 22b are opposite in polarity to each other, allowing ease in discriminating between the pulse signals indicating the rise and the fall timing, respectively.

The shapes and pulse widths of these transmitting pulse signals are independent of the original transmitting signal waveform and are fixed, and their pulse widths are chosen such that they are sufficiently smaller than the minimum pulse interval of the original transmitting signal waveform and do not overlap the minimum pulse width of the original transmitting signal waveform. In other words, the width of each transmitting pulse signal limits the minimum pulse interval and minimum pulse width of a transmittable signal waveform.

The light intensity modulation circuit 23 and the AC-coupled receiving circuit 24 are identical in construction with those depicted in FIG. 1, but in this embodiment the light intensity modulation circuit 23 receives the transmitting pulse signals from the transmitting pulse generators 22a and 22b, and outputs an opposite-polarity optical pulse pair (a light intensity signal (e)) based on the inputs thereto, whereas the AC-coupled receiving circuit 4 receives the light intensity signal sent thereto and outputs a received signal (f).

The discrimination circuit 25a discriminates the rise timing from the received signal (f) detected by the AC-coupled receiving circuit 4, and the discrimination circuit 25b discriminates the fall timing from the received signal (f). These discrimination circuits 25a and 25b performs such discrimination operations as described below, based on a threshold level L1 with reference to which timing discrimination is made, a rise edge discrimination start level L2 and a fall edge discrimination start level L3 set sufficiently low though to such an extent as to permit separation between noise and signal.

In the discrimination of the rise timing, at the instant A when the rise edge of the received signal (f) crosses the discrimination start level L2, the discrimination circuit 25a is instantaneously actuated and at the same time the discrimination circuit 25b is instantaneously made inoperative, and the instant B when the waveform of the received signal (f) crosses the threshold level L1 within a fixed delay time is discriminated by the discrimination circuit 25a, which is caused to generate a timing pulse at this instant B.

In the discrimination of the fall timing, at the instant C when the fall edge of the received signal (f) crosses the fall edge discrimination start level L3, the discrimination circuit 25b is instantaneously actuated and at the same time the discrimination circuit 25a is instantaneously made inoperative, and the instant D when the waveform of the received signal (f) crosses the threshold level L1 within a fixed delay time is discriminated by the discrimination circuit 25b, which is caused to generate a timing pulse at this instant D.

According to the above discrimination operation, since the discrimination circuit 25b remains inoperative within a fixed period of time after the instant A when the rise edge crossed the discrimination start level L2, there is no possibility that the discrimination circuit 25b erroneously discriminates the instant C' when the waveform of the received signal (f) crosses the discrimination level L1 after the discrimination circuit 25a discriminated the instant B of the waveform of the received signal (f) having crossed the discrimination level L3.

Similarly, since the discrimination circuit 25a remains inoperative within a fixed period of time after the instant C when the fall edge crossed the discrimination start level L3, there is no possibility that the discrimination circuit 25a erroneously discriminates the instant A' when the waveform of the received signal (f) crosses the discrimination level L1 after the discrimination circuit 25b discriminated the instant D of the waveform of the received signal (f) having crossed the discrimination level L3.

During the no-pulse (Ac component) period of the received signal (f), the discrimination circuits 25a and 25b are both out of operation, so that there is no likelihood of a low-level fluctuation by noise being erroneously discriminated as a pulse.

In the optical signal transmission system described above, the rise edge can be regenerated by using the timing pulse (the rise timing) available from the discrimination circuit 25a, for example, as a set signal of an asynchronous RS flip-flop circuit, and the fall edge can be regenerated by using the timing pulse (fall timing) available from the fall edge discrimination circuit 25b as a reset signal of the asynchronous RS flip-flop circuit. By this, the original binary transmitting signal waveform can be regenerated.

Next, a description will be given of a concrete circuit configuration for implementing the optical signal transmission system according to the second embodiment described above. It must be noted here that the circuit configuration described below is intended as being merely illustrative of the circuit configuration for implementing this transmission system and should not be construed as limiting the construction of the invention.

FIG. 8 illustrates in block form an example of a concrete circuit configuration of the optical signal transmission system depicted in FIG. 6. In this concrete example, there are provided at the receiving side leading and fall edge detecting circuits 31a and 31b which detect the leading and fall edges of the transmitting signal waveform, transmitting pulse generators 32a and 32b into which the output signals from the edge detecting circuits 31a and 31b are input, and a fixed-bias LD driving circuit 33 which uses the output signals from the transmitting pulse generators 32a and 32b as LD driving signals.

At the receiving side there are provided an AC-coupled receiving circuit 34, discrimination circuits 35a and 35b into which the output from the AC-coupled receiving circuit 34 is input, and an asynchronous RS flip-flop 36 which is set by the output signal from the discrimination circuit 35a and reset by the output signal from the discrimination circuit 35b. The transmitting side and the receiving side are interconnected via an optical fiber.

The leading and fall edge detecting circuits 31a and 31b, the transmitting pulse generators 32a and 32b, and the AC-coupled receiving circuit 34 are identical in construction and in operation with those depicted in FIG. 6, and hence no description will be repeated.

The fixed-bias LD driving circuit 33 is one that drives a laser diode (not shown) which is a light emitting device; they drive the laser diode using, as driving signals, pairs of pulses which are available from the transmitting pulse generators 12a and 12b and reverse their polarity relative to each other at the rise and the fall timing, thereby generating a light-intensity modulated signal. For the generation of the light-intensity modulated signal by the fixed-bias LD driving circuit 33, a conventional method is employed which previously applies a bias current to the laser diode to cause it to emit light (offset light) and modulates the driving current of the laser diode in accordance with the driving signal.

The discrimination circuit 35a comprises a comparator 350a for timing discrimination use, a comparator 351a for determining whether or not to operate the comparator 350a, a delay adjustment circuit 352a and delay/time constant adjustment circuits 353a, 354a and 355a. Similarly, the discrimination circuit 35b comprises a comparator 350b for timing discrimination use, a comparator 351b for determining whether or not to operate the comparator 350b, a delay adjustment circuit 352b and delay/time constant adjustment circuits 353b, 354b and 355b.

In the discrimination circuit 35a, the output from the AC-coupled receiving circuit 34 is branched to one input terminal of the comparator 351a and to one input terminal of the comparator 350a via the delay adjustment circuit 352a. The comparator 351a receives at the other input terminal a rise edge discrimination start reference voltage, and compares it with an input voltage from the AC-coupled receiving circuit 34, determining whether or not to operate the comparator 350a.

The output from the comparator 351a is fed via the delay/time constant adjustment circuit 353a to an enable signal input terminal of the comparator 350a and to a disable signal input terminal of the comparator 350a via the delay/time constant adjustment circuit 354a so that the operation of the comparators 350a and 351a can be controlled.

The comparator 350a has its other input terminal grounded, and compares the ground potential and the input voltage fed from the AC-coupled receiving circuit 34, detecting the rise timing. The output signal from the comparator 350a is input via the delay/time constant adjustment circuit 355a into an S (Set) terminal of the asynchronous RS flip-flop 36.

In the discrimination circuit 35b, the output from the AC-coupled receiving circuit 34 is similarly branched to one input terminal of the comparator 351b and to one input terminal of the comparator 350b via the delay adjustment circuit 352b. The comparator 351b receives at the other input terminal a fall edge discrimination start reference voltage, and compares it with an input voltage from the AC-coupled receiving circuit 34, determining whether or not to operate the comparator 350b.

The output from the comparator 351b is fed via the delay/time constant adjustment circuit 353b to an enable signal input terminal of the comparator 350b and to a disable signal input terminal of the comparator 350b via the delay/time constant adjustment circuit 354b so that the operation of the comparators 350b and 351b can be controlled.

The comparator 350b has its other input terminal grounded, and compares the ground potential and the input voltage fed from the AC-coupled receiving circuit 34, detecting the fall timing. The output signal from the comparator 350b is input via the delay/time constant adjustment circuit 355b into an R (Reset) terminal of the asynchronous RS flip-flop 36.

Next, a description will be made of the operation of the optical signal transmission system according to the second embodiment. Upon input of a binary digital signal waveform (a transmitting signal waveform) into the leading and fall edge detecting circuits 31a and 31b, the rise edge detecting circuit 31a detects the rise edge of the input transmitting signal waveform and the fall edge detecting circuit 31b the fall edge of the input transmitting signal waveform.

The rise edge of the transmitting signal waveform detected by the rise edge detecting circuit 31a is provided to the transmitting pulse generator 32a, which generates a pair of pulses that reverse their polarity relative to each other at the timing of the input rise edge. Similarly, the transmitting pulse generator 32b generates a pair of pulses that reverse their polarity relative to each other at the timing of the input fall edge.

The fixed-bias LD driving circuit 33 drives the laser diode by the opposite-polarity pulse pairs supplied from the transmitting pulse generators 32a and 32b, generating a light intensity modulated signal composed of the opposite-polarity optical pulse pairs. This light intensity modulated signal is sent over the optical fiber to the receiving side, wherein it is received by the AC-coupled receiving circuit 34.

Upon receiving the light intensity modulated signal, the AC-coupled receiving circuit 34 converts only the AC component of the received light intensity modulated signal into an electric signal. By this, the original opposite-polarity pulse pair is generated, which is output as the received signal. The received signal from the AC-coupled receiving circuit 34 is branched to the discrimination circuits 35a and 35b.

The received signal input into the discrimination circuit 35a is fed first to the comparator 351a. The comparator 351a compares the voltage of the input received signal and the rise edge discrimination start reference voltage, thereby detecting the input of a pulse and outputting a pulse-like signal. The pulse-like output signal is branched to the delay/time constant adjustment circuits 353a and 354a, wherein the input signals thereto are processed into signals of sufficient pulse widths, which are applied to the enable signal input terminal of the comparator 350a and the disable signal input terminal of the comparator 351b, respectively.

Supplied with the enable signal, the comparator 150a starts its operation, then discriminates the center portion of the opposite-polarity pulse pair (the received signal), that is, the timing of its reversal of polarity, and outputs a pulse-like signal (a timing signal) indicating the discriminated timing. On the other hand, the comparator 351a is disabled by the disable signal for a fixed period of time, preventing the comparator 350a from malfunction.

In the discrimination circuit 35a, the delay times of the opposite-polarity pulse pair (the received signal) by the input paths to the comparators 350a and 351a are adjusted by the delay adjustment circuit 352a and the delay/time constant adjustment circuit 353a so that the comparator 351a starts its operation prior to the arrival of the opposite-polarity pulse pair (the received signal) at the one input terminal of the comparator 350a; besides, the delay time of the input path to the comparator 351b is adjusted by the delay/time constant adjustment circuit 354a so that the comparator 351b is disabled prior to the arrival of a signal subsequent to the above-mentioned opposite-polarity pulse pair.

The timing signal output from the comparator 350a is processed by the delay/time constant adjustment circuit 355a into a signal of a sufficient pulse width, which is input into the S (Set) terminal of the asynchronous RS flip-flop 36.

As is the case with the above, the received signal fed into the discrimination circuit 35b is applied to the comparator 351b. The comparator 351b compares the voltage of the input received signal and the fall edge discrimination start reference voltage, thereby detecting the input of a pulse and outputting a pulse-like signal. The pulse-like output signal is branched to the delay/time constant adjustment circuits 353b and 354b, wherein the input signals thereto are processed into signals of sufficient pulse widths, which are applied to the enable signal input terminal of the comparator 350b and the disable signal input terminal of the comparator 351a, respectively.

Supplied with the enable signal, the comparator 350b starts its operation, then discriminates the center portion of the opposite-polarity pulse pair (the received signal), that is, the timing of its reversal of polarity, and outputs a pulse-like signal (a timing signal) indicating the discriminated timing. On the other hand, the comparator 351a is disabled by the disable signal for a fixed period of time, preventing the comparator 350a from malfunction.

In the discrimination circuit 35b, the delay times of the opposite-polarity pulse pair (the received signal) by the input paths to the comparators 350b and 351b are adjusted by the delay adjustment circuit 352b and the delay/time constant adjustment circuit 353b so that the comparator 351b starts its operation prior to the arrival of the opposite-polarity pulse pair (the received signal) at the one input terminal of the comparator 350b; besides, the delay time of the input path to the comparator 351b is adjusted by the delay/time constant adjustment circuit 354b so that the comparator 351a is disabled prior to the arrival of a signal subsequent to the above-mentioned opposite-polarity pulse pair.

The timing signal output from the comparator 350b is processed by the delay/time constant adjustment circuit 354b into a signal of a sufficient pulse width, which is input into the R (Reset) terminal of the asynchronous RS flip-flop 36.

When thus supplied with the set signal and the reset signal from the discrimination circuits 35a and 35b, the asynchronous RS flip-flop 36 responds to the input thereto of the set signal to go to the logic "1" state to thereby reproduce the rise edge of the original transmitting signal waveform, and responds to the input thereto of the reset signal to go to the logic "0" state to thereby reproduce the fall edge of the original transmitting signal waveform. This circuit compensates for an unnecessary time difference between the two transmission and processing lines for the rise edge timing and the fall edge timing transmission by the delay/time constant adjustment circuits 355a and 355b—this ensures that the transmitting signal waveform reproduced by the asynchronous RS flip-flop 36 becomes the binary signal of the same polarity and timing as those of the signal prior to its transmission.

In the application of the above-described system of the second embodiment to a high-speed binary signal transmission, comparators and other circuit elements are required to be faster in operation than those used in an electric transmission system and those used in the above-described first embodiment.

Figure 9:
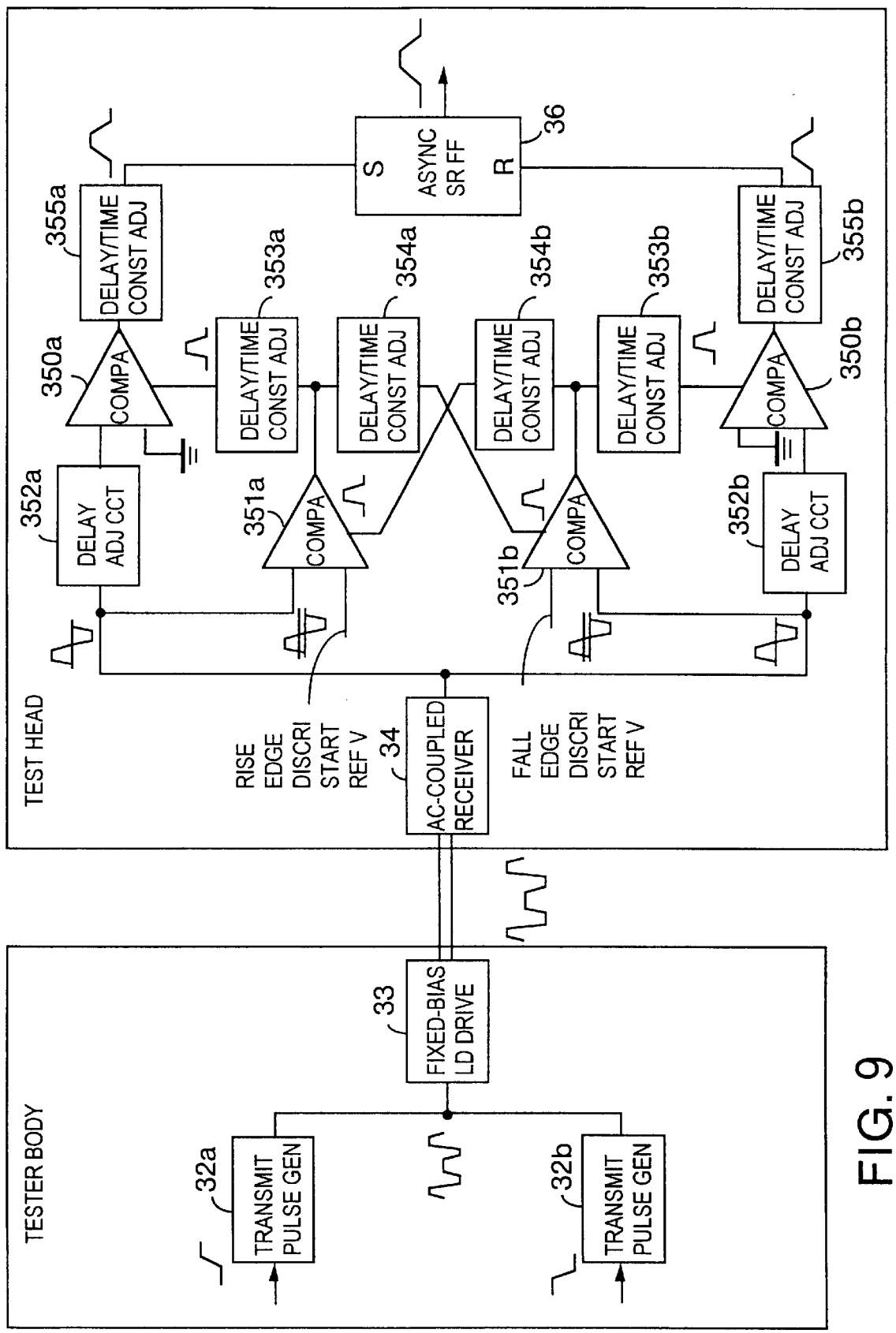
FIG. 9 is a block diagram depicting the general configuration of a semiconductor device tester utilizing the optical signal transmission system according to the second embodiment of the present invention.

The circuit configuration of the optical signal transmission system according to the second embodiment described above is applicable to a semiconductor device tester as well. Turning next to FIG. 9, a semiconductor device tester using the optical signal transmission system of the above circuit configuration will be described concretely.

As depicted in FIG. 9, the tester proper has a transmitting part composed of the leading and fall edge detecting circuits 31a and 31b (not shown), the transmitting pulse generators 32a and 32b and the fixed bias LD driving circuit 33, and the test head has a receiving part composed of the AC-coupled receiving circuit 34, the discrimination circuits 35a and 35b and the asynchronous RS flip-flop 36. The transmitting part and the receiving part are interconnected using optical fibers.

With this arrangement, a signal in which many periods are mixed and the binary data to be sent heavily inclines toward one particular value (0 or 1)—which is transmitted between the tester proper and the test head of the semiconductor device tester—is transmitted from the transmitting part after conversion to transmitting pulse signals composed of opposite-polarity pulse pairs which indicate the timing at which only the leading and fall edges of the signal waveform cross the predetermined levels, and the receiving part electrically reproduces the original transmitting signal waveform from the discriminated rise and fall timing; hence, the original signal can be regenerated without causing polarity and timing errors.

In the semiconductor device tester, since the binary signal available in the tester proper is divided into the leading and fall edges, it is possible to omit the leading and fall edge detecting circuits 31a and 31b as not shown in FIG. 9, permitting reduction of the cost of the entire system.

Next, a third embodiment will be described with reference to the drawings associated therewith.

FIG. 10 depicts a concrete example of an optical pulse transmitting device embodying the optical signal transmitting method according to the present invention. In this example, too, a light emitting device LD like a laser diode is used, and constant-current circuits 110A, 110B and 110C are connected to the light emitting device LD. The constant-current circuits 110A and 110B are shown to be connected to the light emitting device LD via current switches 111A and 111B, respectively, and the constant-current circuit 110C is shown to be connected directly to the light emitting device LD. Accordingly, the light emitting device LD is always supplied with a current Ic flowing across the constant-current circuit 110C.

The current switches 111A and 111B are turned ON by H logic (a high logical level) provided thereto as a control voltage and turned OFF by L logic (a low logical level). The current switch 111A has its control terminal connected directly to an input terminal IN. The current switch 111B has its control terminal connected to the input terminal IN via a series circuit composed of an inverter 112 and a delay element 113.

In the above construction, such a positive pulse P as depicted in FIG. 11A is applied to the input terminal IN. For convenience of description, let it be assumed that the delay time Td of the delay element 113 and the pulse width Pw of the pulse P bear a relationship that Pw=Td.

When the pulse P is applied to the input terminal IN, the current switch 111A is immediately turned ON as depicted in FIG. 11B. Since the current switch 111B is supplied with the pulse P after it is inverted by the inverter 112 and delayed by the delay element 113, the current switch 111B is always held in the ON state, and at the rise timing of the input pulse P it is held in the OFF state by the time interval of the pulse width Td.

Hence, the light emitting device LD is supplied with such currents as depicted in FIG. 11D. That is, during the no-signal period, the sum $I_b+I_c$ of currents $I_b$ and $I_c$ flowing across the constant-current circuits 110B and 110C is injected as a bias current; while the pulse P is applied to the input terminal IN, the sum $I_a+I_b+I_c$ of the currents $I_a$, $I_b$ and $I_c$ flowing across all the constant-current circuits 110A to 110C is injected; and at the timing after the fall of the pulse P the current switches 111A and 111B are both turned OFF, and consequently, at this timing only the current $I_c$ flowing across the constant-current circuit 110C is injected.

Upon expiration of the pulse duration Td of the pulse input thereinto, the current switch 111B is returned to the ON state. Consequently, the current $I_b+I_c$ is injected again into the light emitting device LD.

Thus, in the concrete example shown in FIG. 10, the bias current that is injected into the light emitting device LD is $I_b+I_c$, and the currents $I_a+I_b+I_c$ and $I_c$, which go positive and negative about the bias current $I_b+I_c$, respectively, are injected to the light emitting device LD. The intensity of light emitted from the light emitting device LD takes the same waveform as the current waveform depicted in FIG. 11D. Assume that the current $I_c$ is larger than a threshold current $I_{ON}$ with which the light emitting device LD starts emission of light as depicted in FIG. 11D.

Figure 12:
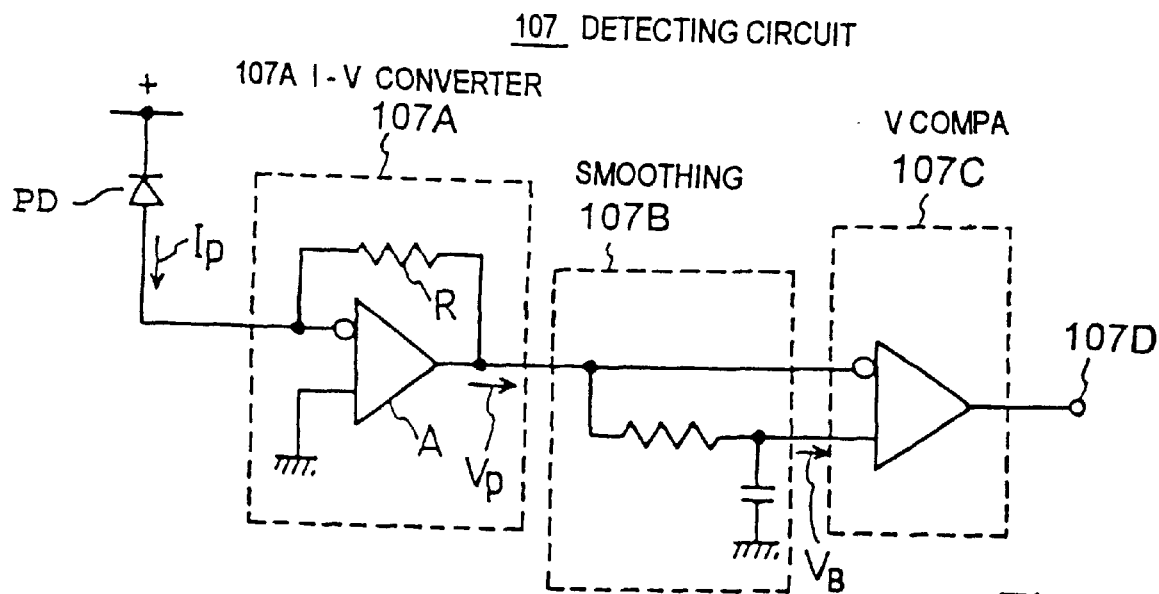
FIG. 12 is a circuit diagram depicting an optical pulse detector according to the third embodiment of the present invention.

In FIG. 12 there is shown a specific operative example of a detecting circuit that is provided in a receiving device 102. In this example the detecting circuit 107 is shown to be made up of a current-to-voltage converting circuit 107A for converting the received optical current signal from a photodetector PD into a voltage signal, a smoothing circuit 107B and a voltage comparator 107C that has a hysteresis.

The current-to-voltage converting circuit 107A may be formed by an operational amplifier A and a feedback resistor R. The smoothing circuit 107B may be formed by a time constant circuit that has a time constant sufficiently larger than the pulse width Pw of the pulse P transmitted. To a non-inverting input terminal of the voltage comparator 107C is provided via the smoothing circuit 107B a reference voltage corresponding to the bias value sent from the transmitting side. The output signal from the current-to-voltage converting circuit 107A is provided intact to an inverting input terminal of the voltage comparator 107C.

With such an arrangement, the smoothing circuit 107B is always supplied with a reference voltage that corresponds to the bias current $I_b+I_c$ which is sent from the transmitting side. Accordingly, the voltage comparator 107C provides either one of H logic and L logic to an output terminal 107D, depending on whether the voltage applied to the inverting input terminal is higher or lower than the reference voltage applied to the non-inverting input terminal. Further, the voltage comparator 107C has a hysteresis characteristic between the two input terminals; hence, even if the voltages at the both input terminals are equal to the reference voltage, the output at the terminal 107D is kept L-logic or H-logic, depending on whether the input voltage at the non-inverting input terminal restored to the same reference voltage from the state in which the input voltage was further negative or positive than the voltage fed to the inverting input terminal.

Figure 13:
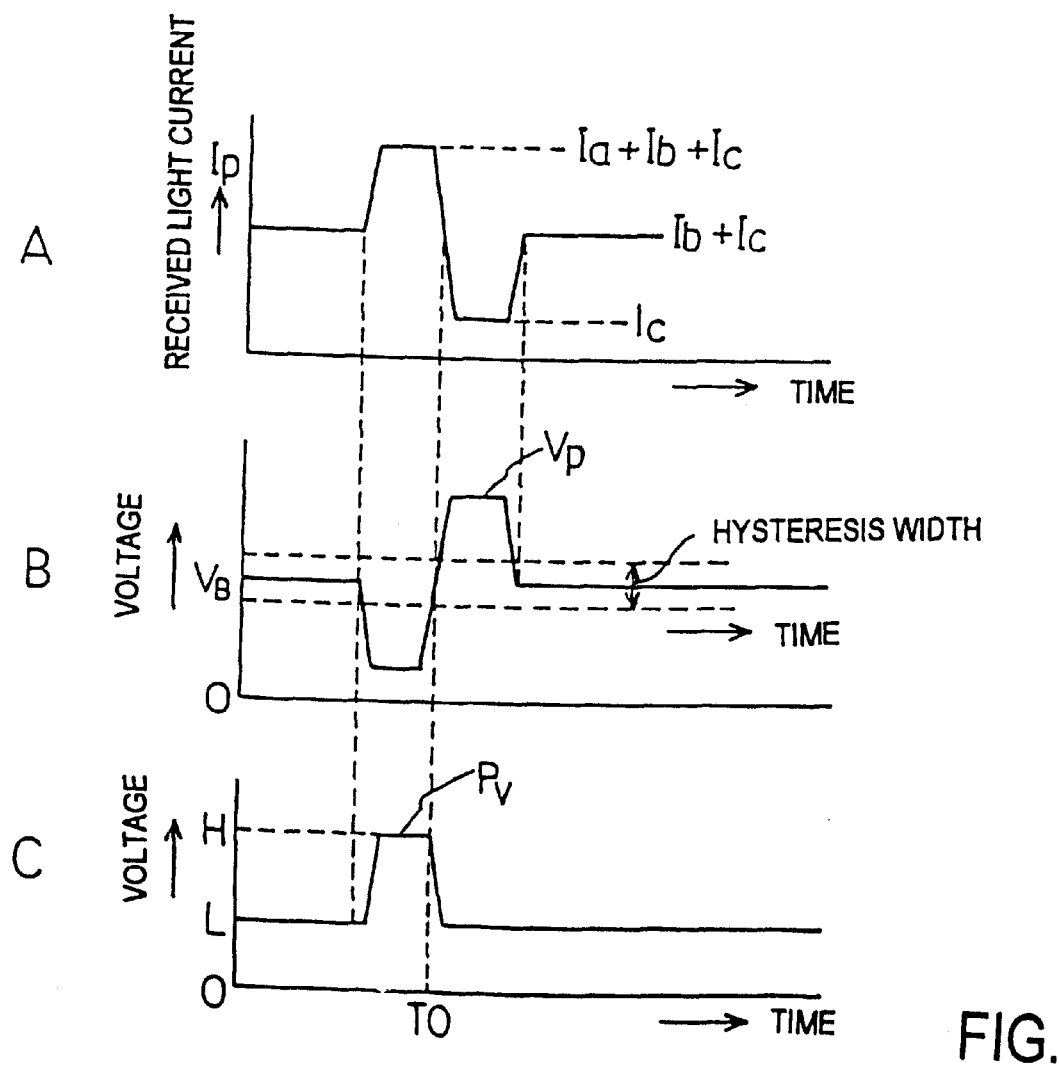
FIG. 13 is a timing chart for explaining the operation f the optical pulse detector shown in FIG. 12.

Now, assuming that a received optical current $I_P$ shown in FIG. 13A is received by the receiving device depicted in FIG. 12, the current-to-voltage converting circuit 107A outputs a bias voltage $V_B$ and a pulse waveform $V_P$ shown in FIG. 13B. Even if supplied with the pulse waveform $V_P$, the smoothing circuit 107B smoothes it and continues to apply to the non-inverting input terminal of the voltage comparator 107C the reference voltage that matches the bias voltage $V_B$. Hence, when the pulse waveform $V_P$ is fed to the inverting input terminal of the voltage comparator 107C and its voltage exceeds the hysteresis width on the positive side, the voltage comparator 107C provides H logic at the output terminal 107D as depicted in FIG. 13C.

When the pulse waveform $V_P$ at the inverting input terminal goes across the bias voltage $V_B$ further to the negative than the hysteresis width on the negative side, the output terminal 107D of the voltage comparator 107C goes to the L-logic level. Accordingly, the voltage comparator 107C provides to the output terminal 107D the pulse $P_V$ depicted in FIG. 13C. In this case, even if the value of the bias current $I_b+I_c$ (which is the same as the bias voltage $V_B$) of the received optical current signal $I_P$ varies, the rise timing of this pulse $P_V$ remains unchanged because the rise timing is determined depending on whether or not the pulse waveform $V_P$ at the inverting input terminal of the voltage comparator 107C exceeds the hysteresis width on the positive side. As a result, even if the injected current vs. output light power characteristic of the light emitting device LD varies due to a temperature change at the transmitting side, the detection timing of the pulse signal transmitted does not change. Hence, a jitter-free signal can be transmitted and received. In the pulse waveform $V_P$ that is output from the current-to-voltage converting circuit 107A, the zero-crossing point from positive to negative (or from negative to positive) is the fastest point of crossing the bias voltage $V_B$. It is considered, therefore, that the zero-crossing point is the position where the point of timing detection undergoes the least variations in the direction of the time axis. Consequently, the fall edge position TO of the pulse waveform $V_P$ corresponding to the zero-crossing point, that is, which is output from the voltage comparator 107C, is used as the point of signal detection in practice.

Figure 14:
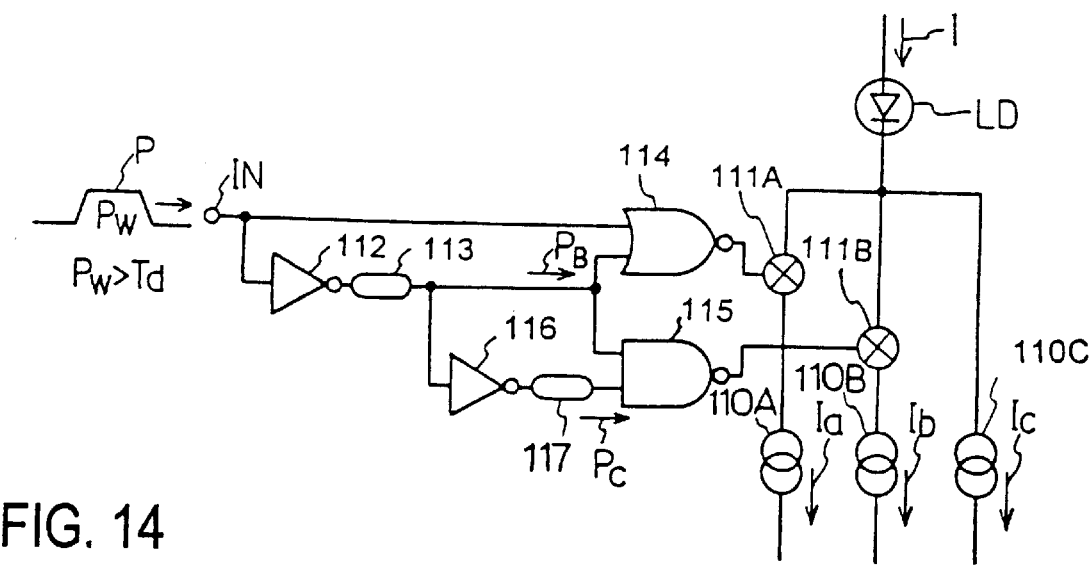
FIG. 14 is a circuit diagram depicting another concrete example of the optical pulse transmitter according to the third embodiment of the present invention.

FIG. 14 illustrates another specific operative example of the optical pulse transmitting device. This example is shown to have a circuit configuration which is equipped with a function of rendering input pulses into optical pulses of a fixed pulse width (which function is commonly called a pulser), in addition to the function of generating optical pulses which go positive and negative across the bias value as in the FIG. 10 example.

An electric pulse P input into the input terminal IN is fed directly to the one input terminal of a NOR gate 114, and at the same time it is applied to the other input terminal thereof via a series circuit composed of an inverter 112 and a delay element 113. Furthermore, the electric pulse P is supplied to the one input terminal of a NAND gate 115 via the series circuit of the inverter 112 and the delay element 113, and the signal delayed by an inverter 116 and a delay element 117 is fed to the other input terminal of the NAND gate 115. The output signal from the NOR gate 114 is provided as a control signal to a current switch 111A, and the output signal from the NAND gate 115 is similarly applied as a control signal to a current switch 111B.

Figure 15:
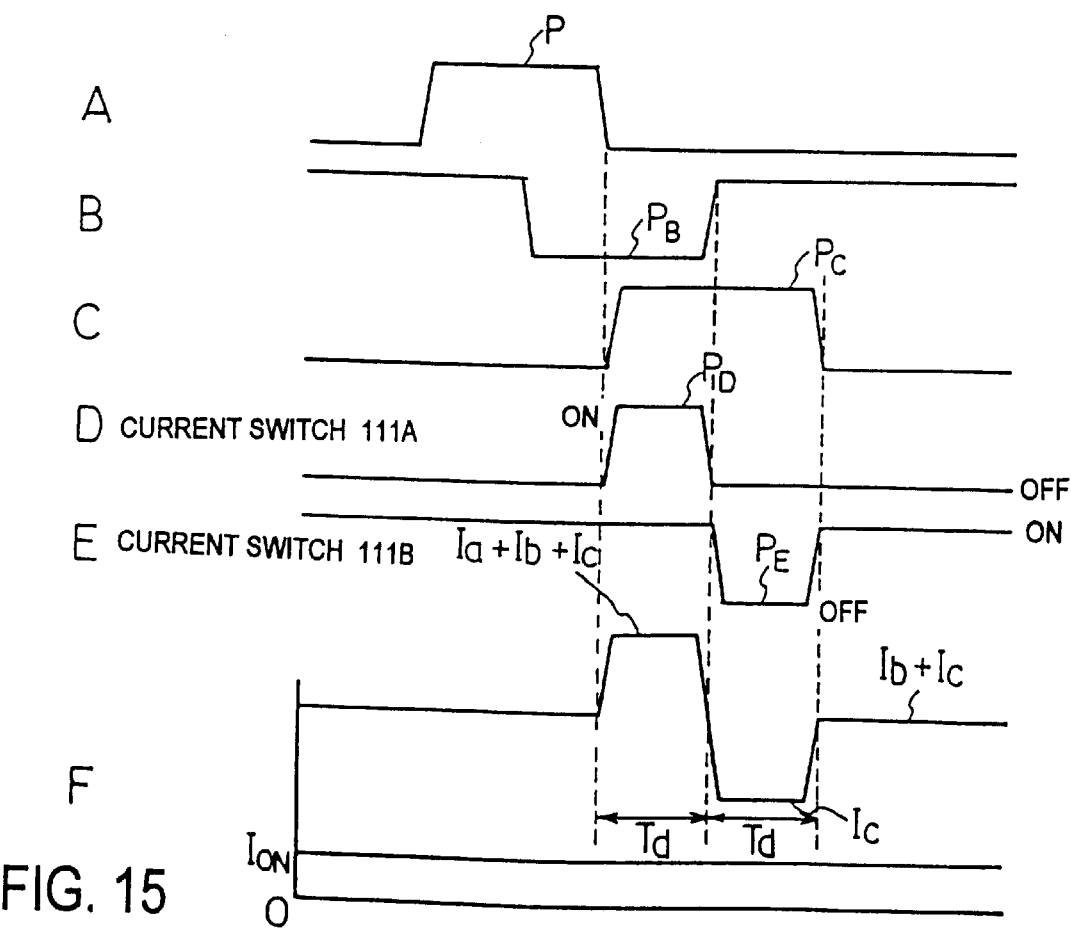
FIG. 15 is a waveform diagram for explaining the operation of the optical pulse transmitter depicted in FIG. 14.

Now, a description will be given, with reference to FIG. 15, of the operation of this example on the assumption that the pulse width Pw of the pulse P input into the input terminal IN is longer than the delay time Td by the delay elements 113 and 117, that is, Pw>Td.

FIG. 15A shows the pulse P fed to the input terminal IN. FIG. 15B shows the waveform of a pulse $P_B$ that is applied to the one input terminal of each of the NOR gate 114 and the NAND gate 115 via the inverter 112 and the delay element 113. The NOR gate 114 provides to its output a pulse $P_D$ depicted in FIG. 15D, and while the pulse $P_D$ is at the H-logic level, the current switch 111A is held in the ON state. The time for which the current switch 111A is controlled to remain in the ON state is defined to be equal to the delay time Td of the delay element 113.

FIG. 15C shows the waveform of a pulse $P_C$ that is supplied to the other input terminal of the NAND gate 115 via the inverter 116 and the delay element 117. Since the NAND gate 115 is supplied with the pulse $P_B$ depicted in FIG. 15B and the pulse $P_C$ depicted in FIG. 15C, it provides to its output a pulse $P_E$ depicted in FIG. 15E. That is, the NAND gate 115 always provides the H-logic output, and hence the current switch 111B is controlled to be in the ON state at all times. Since the pulse $P_E$ is output as a negative-going pulse signal, the current switch 111B is turned ON only while the pulse $P_E$ is at the L-logic state.

Consequently, as shown in FIG. 15F, the current I that flows to the light emitting device LD is $I_a+I_b+I_c$ above $I_b+I_c$ when the current switch 111A is ON and $I_c$ below $I_b+I_c$ when the current switches 111A and 111B are both OFF.

Accordingly, as is the case with the concrete example depicted in FIG. 10, upon each input of the pulse P, the light emitting device LD is driven by the current of the waveform which goes positive and negative symmetrically with respect to the mean current $I_b+I_c$ and without changing the men current value; therefore, it will easily be understood that the concrete example of FIG. 14 also produces the same effects as those described previously in respect of FIGS. 10 to 13.

Moreover, in this concrete example, even if the pulse width Pw of the input pulse P is longer than the delay time Td of the delay elements 113 and 117, the pulse waveform of the optical pulse that is emitted by the light emitting device LD is limited to a fixed pulse width determined by the delay time Td of the delay element. Since the output optical pulse is limited to a constant value even if the pulse width of the input pulse P is long, it is possible to avoid a disadvantage that the reference voltage available from the smoothing circuit 107B (see FIG. 12) varies at the receiving side due to the transmission thereto of a pulse of a long pulse width.

Furthermore, since the concrete example of FIG. 14 has a construction in which the fall edge side of the pulse P to be transmitted is detected to generate the optical pulse, the light emitting device LD is driven in a state more stable than in the case of utilizing the initial waveform portion of the rise edge of the signal; hence, it is also possible to accurately define the timing (the waveform depicted in FIG. 15F) for driving the light emitting device LD.

Figure 16:
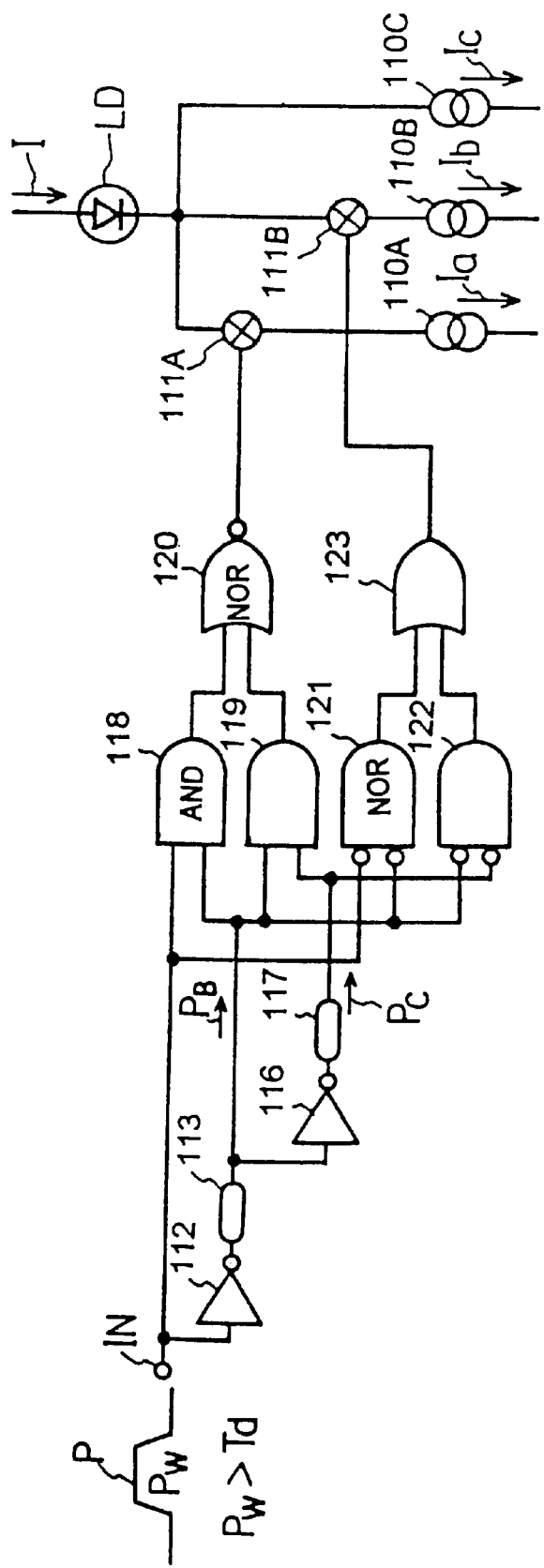
FIG. 16 is a circuit diagram depicting still another concrete example of the optical pulse transmitter according to the third embodiment of the present invention.

FIG. 16 illustrates still another specific operative example of the optical pulse transmitting device 101. This example shows the case of transmitting the pulse width of the optical pulse to the receiving side. That is, this example has an arrangement that drives the light emitting device by a symmetrical signal which goes positive and negative at both of the rise timing and the fall timing of the pulse P to be transmitted.

Figure 17:
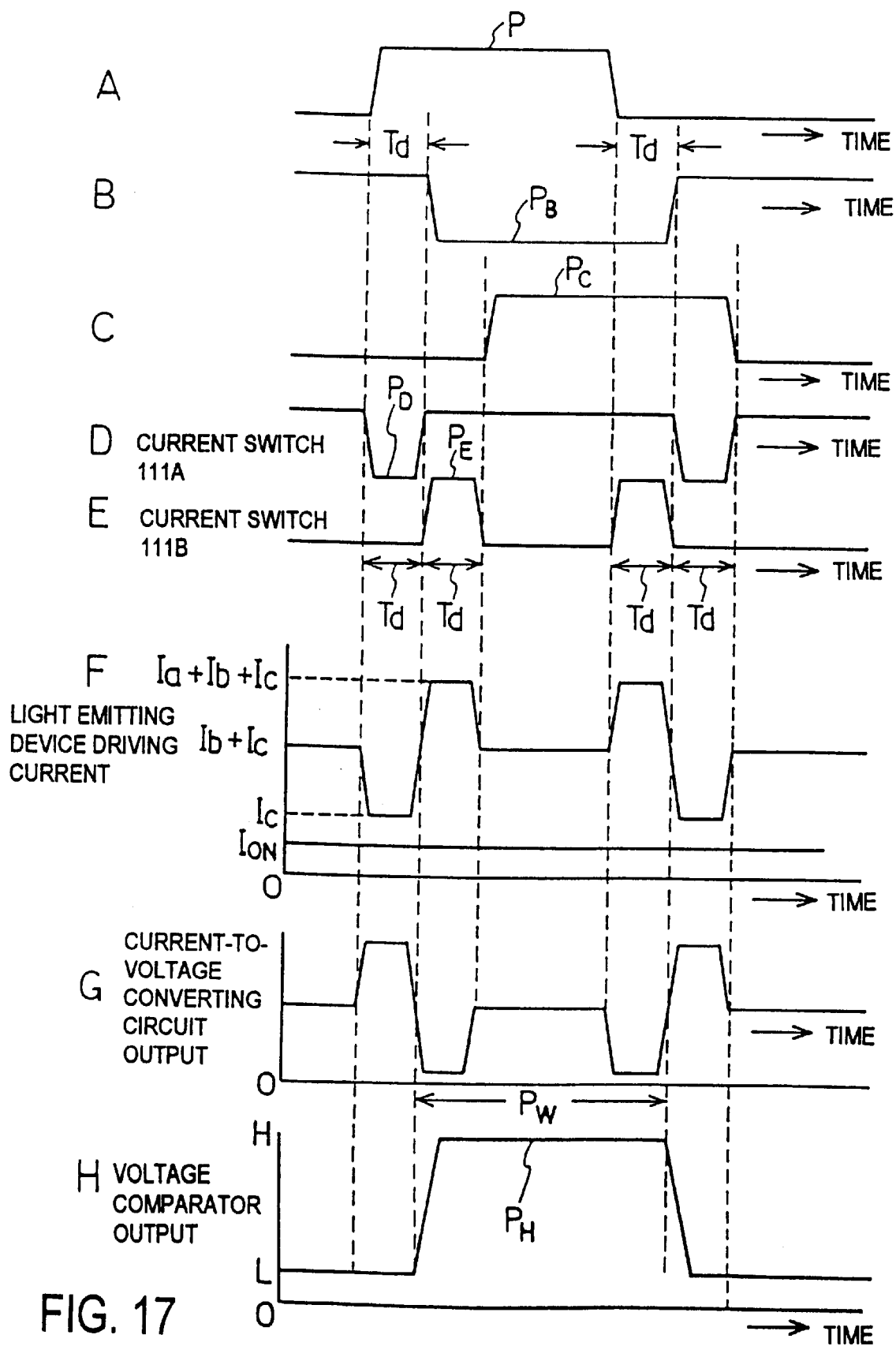
FIG. 17 is a timing chart for explaining the operation of the optical pulse transmitter depicted in FIG. 16.

The control circuit for the current switch 111A is made up of, in this example, two AND gates 118 and 119 and a NOR gate 120. The AND gate 118 is supplied with an input pulse P (FIG. 17A) and a pulse $P_B$ (FIG. 17B) having passed through the inverter 112 and the delay element 113, the other AND gate 119 is supplied with the pulse $P_B$ (FIG. 17B) having passed through the inverter 112 and the delay element 113 and a pulse $P_C$ (FIG. 17C) having passed through the inverter 116 and the delay element 117, and the outputs from the AND gates 118 and 119 are output via the NOR gate 120. As a result, a negative pulse $P_D$ depicted in FIG. 17D is provided at the output of the NOR gate 120. This negative pulse $P_D$ is generated at both of the rise timing and the fall timing of the input pulse P and fed to the current switch 111A. Hence, the current switch 111A is held OFF by a time interval equal to the delay time Td at both of the rise and the fall timing of the input pulse P.

The control circuit for the current switch 111B in this example, is formed by two NOR gates 121 and 122 and an OR gate 123. The NOR gate 121 is supplied with the input pulse P (FIG. 17A) and the pulse $P_B$ (FIG. 17B) having passed through the inverter 112 and the delay element 113, the other NOR gate 122 is supplied with the pulse $P_B$ (FIG. 17B) having passed through the inverter 112 and the delay element 113 and the pulse $P_C$ (FIG. 17C) having passed through the inverter 116 and the delay element 117, and the outputs from the NOR gates 121 and 122 are output via the OR gate 123, which provides at its output a positive pulse $P_E$ depicted in FIG. 17E.

Through ON-OFF control of the current switches 111A and 111B by the pulses $P_D$ and $P_E$, a current I shown in FIG. 17F is injected into the light emitting device LD, which emits optical pulses corresponding to the value of the current I.

FIG. 17G depicts the output signal which is provided from the current-to-voltage converting circuit 107A when the receiving device shown in FIG. 12 receives the optical pulse emitted from the light emitting device driven by the current I shown in FIG. 17F. The time interval between respective zero-crossing points of the voltage output signal matches the pulse width Pw of the input pulse P at the transmitting side, and the voltage comparator 107C yields at its output terminal 107D a negative pulse $P_H$ depicted in FIG. 17H in this example. Thus, the receiving side receives the pulse $P_H$ of the same pulse width Pw as that of the input pulse P at the transmitting side.

Figure 24:
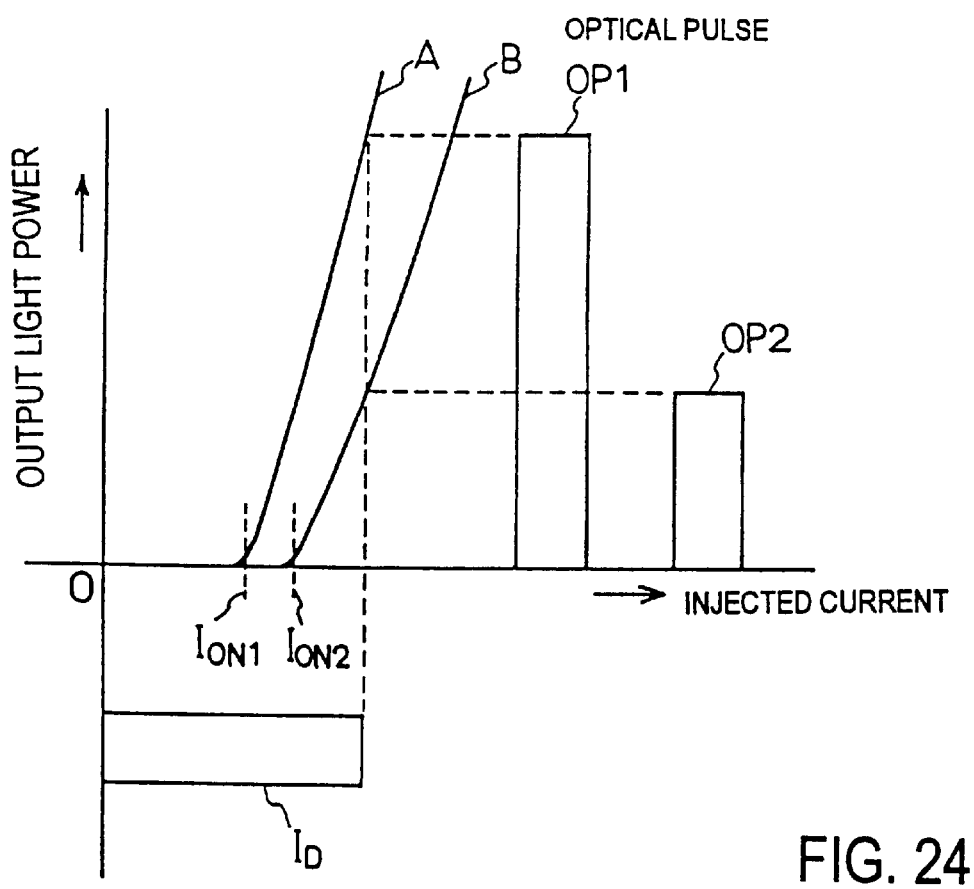
FIG. 24 is a graph for explaining an example of an injected current vs. Output light power characteristic of a light emitting device shown in FIG. 23.
Figure 25:
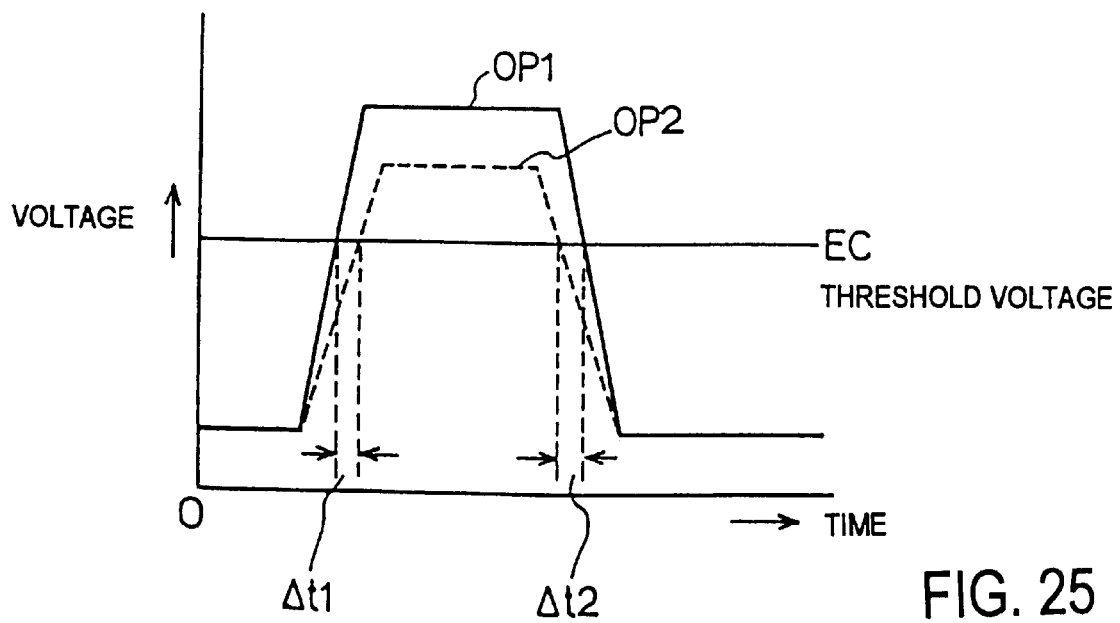
FIG. 25 is a waveform diagram for explaining the waveform of a pulse transmitted by the conventional optical pulse transmitting system depicted in FIG. 23.

As is the case with the example described previously with reference to FIGS. 10 to 13, since the optical pulse is transmitted as a symmetrical waveform which goes positive and negative about the mean current $I_b+I_c$ (FIG. 17F), the mean value of light on the optical transmission line will not vary depending on the presence or absence of a signal. Accordingly, as referred to previously in respect of FIGS. 10 to 13, the smoothed output voltage of the smoothing circuit 107B placed at the stage preceding the voltage comparator 107C is kept at a constant value without undergoing any variations depending on whether a signal is received or not. Furthermore, even in the case where the injected current vs. output light power characteristic (see FIG. 24) of the light emitting device LD varies due to a temperature change or the like and the mean current value to be transmitted and the smoothed output voltage vary correspondingly, the hysteresis width of the voltage comparator 107C follows mainly the smoothed output voltage, so that the pulse width of the received pulse $P_H$ accurately matches the pulse width Pw of the input pulse P at the transmitting side irrespective of the characteristic variation of the light emitting device LD.

Next, a fourth embodiment of the present invention will be described with reference to the drawings associated therewith.

A description will be given first, with reference to FIG. 19, of a general configuration of an optical transmission system employing a light intensity modulation device according to the fourth embodiment. In this optical transmission system, the transmitting side T has a light intensity modulation device 460 and the receiving side R has an AC-coupled receiving device 461 and a discrimination circuit 462, the transmitting side T and the receiving side R being interconnected via an optical fiber 463.

The signal that is transmitted in this optical signal transmission system is not data of a binary signal but a timing signal which indicates a point in time when the leading or fall edge of the waveform of the binary signal, that is, the amplitude value (level) of the rise or fall of the transmitting signal exceeds a predetermined amplitude value (level).

Figure 19:
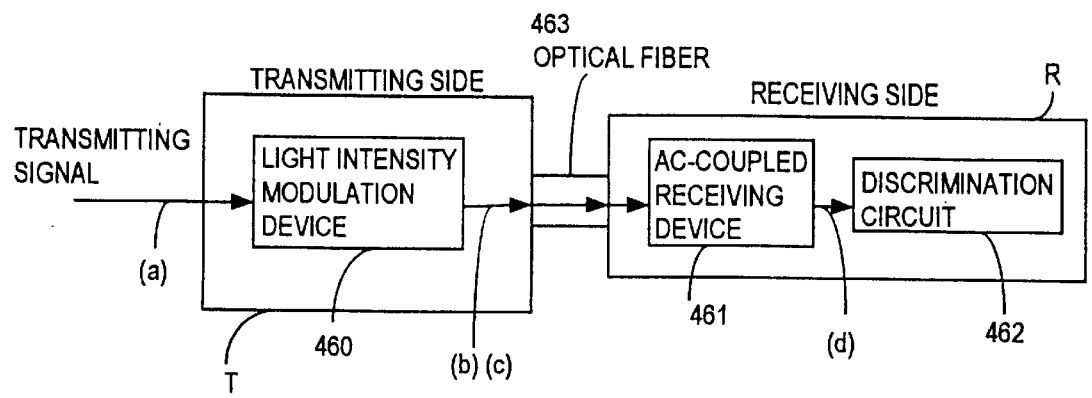
FIG. 19 is a block diagram depicting an example of an optical transmission system employing the light intensity modulator shown in FIG. 18.
Figure 20:
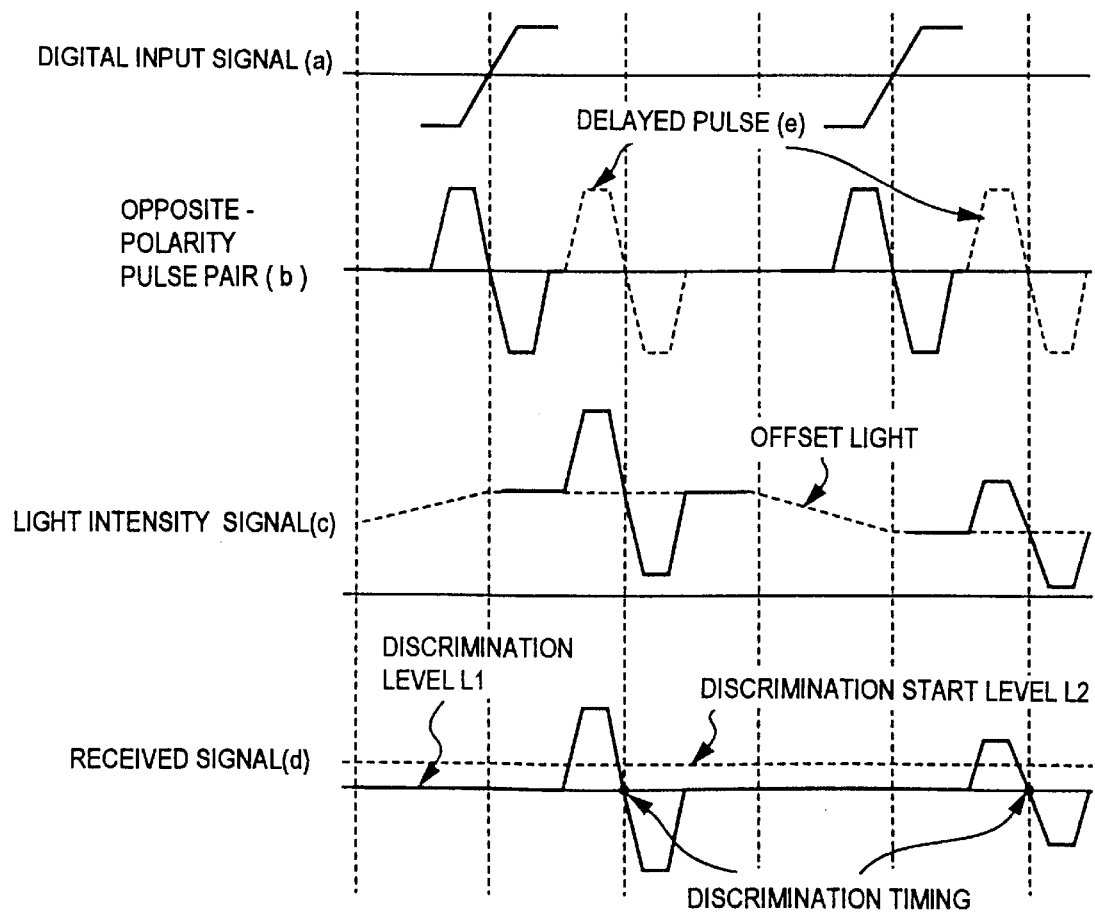
FIG. 20 is a waveform diagram for explaining the operation of the optical transmission system shown in FIG. 19.

FIG. 20 is a timing chart for explaining the operation of the optical transmission system depicted in FIG. 19; the timing chart shows waveforms, for example, in the case of detecting the rise edge of the waveform (timing when the amplitude value of the rise edge exceeds 50%) and transmitting it. With reference to FIG. 20, the operation of each circuit will hereinafter be described concretely.

The light intensity modulation device 460 generates a pair of pulses (b) which reverse their polarity at the rise timing of a binary digital input signal (a). This opposite-polarity pulse pair (b) needs only to have a pulse width sufficiently smaller than the minimum pulse interval of the waveform of the original transmitting signal. In other words, the pulse width of the opposite-polarity pulse pair (b) defines the minimum pulse interval of the waveform of the original transmitting signal.

Incidentally, even when the opposite-polarity pulse pair (b) becomes such a delayed pulse pair (e) as indicated by the broken lines in FIG. 20 due to some delay in its generation, it can be used as a timing signal at the transmitting side without difficulty if the delay is always a fixed and known value.

The light intensity modulation device 460 is driven based on the opposite-polarity pulse pair; that is, a light emitting device (not shown) is driven by a conventional modulation method which modulates the light intensity of offset light, generating as a light intensity signal © a pair of optical pulses that have reversed their polarity at the timing when the amplitude value of the rise edge of the transmitting pulse signal waveform exceeds a predetermined value. The light intensity signal (c) is sent over the optical fiber 463 to the receiving side R.

The AC-coupled receiving circuit 461 is a circuit that detects the received light intensity signal (c) by the conventional AC-coupling method, by which is detected such a received signal (d) as shown at the bottom of FIG. 20. In this instance, since the received light intensity signal (c) is an optical pulse signal modulated based on the pair of opposite-polarity pulses (b) that reverse their polarity to each other at the rise timing, it has always opposite-polarity pulses. Hence, there is no possibility that the received signal (d) to be detected contains many pulses inclining toward one particular polarity.

The discrimination circuit 462, which forms signal regenerating means, discriminates from the received signal (d) detected by the AC-coupled receiving circuit 461, the rise edge (timing of the received signal exceeding a predetermined amplitude value). To discriminate the timing of the rise edge, the following operation is performed based on a threshold level L1 (see FIG. 20) with reference to which the timing discrimination is made, and a discrimination start level L2 (see FIG. 20) which is preset at a level low enough to permit separation of noise and signal and provides the timing for the initiation of the discriminating operation.

At the instant A when the rise edge of the received signal (d) crosses the discrimination start level L2, the discrimination circuit 462 is instantaneously activated, which generates a timing signal upon discrimination of the instant when the received signal crosses the threshold level L1 within a fixed delay time. That is, the discrimination circuit 462 remains operative only by a time interval substantially corresponding to the pulse width after the instant of the rise edge having crossed the discrimination start level L2, and determines the instant of the received signal (d) having crossed the threshold level L1 as discrimination timing, generating the timing pulse. The signal regeneration processing is carried out based on individual timing pulses. With this discriminating operation, since the discrimination circuit 5 does not operate when no pulse is present, it will not erroneously discriminate a low-level fluctuation due to noise as a pulse.

In the signal regeneration processing, the rise edge can be regenerated by using the timing pulse (the rise timing, for instance) available from the discrimination circuit 462, for example, as a set signal of an asynchronous RS (set-reset) flip-flop circuit.

With the configuration depicted in FIG. 19, the light intensity modulation device 460 generates opposite-polarity pulse pairs (which are opposite in polarity to each other) based on the timing of both of the leading and fall edges of the transmitting signal; in the case of performing high-speed optical transmission, it is desirable to provide two transmission channels for transmitting the leading and fall edges of the transmitting signal separately of each other as described below.

That is, detecting circuits (formed by logic circuits or the like) are provided individually for detecting the leading and fall edges of the transmitting signal, respectively, and a light intensity modulation device is provided for each detecting circuit, and the rise timing and fall timing are transmitted separately. In this instance, the receiving side also has a two-channel circuit configuration which consists of a rise timing receiving channel and a fall timing receiving channel, and timing pulses relating to the leading and fall edges are generated in the individual transmission channels and signal regeneration processing is performed accordingly.

In the signal regeneration processing, the leading and fall edges can be reproduced by using the timing pulses from the respective discrimination circuits as set and reset signals of the asynchronous RS flip-flop circuit, respectively. By this, the original binary transmitting signal waveform can be regenerated.

Next, a detailed description will be given of a concrete circuit configuration and operation of the light intensity modulation device 460.

Figure 18:
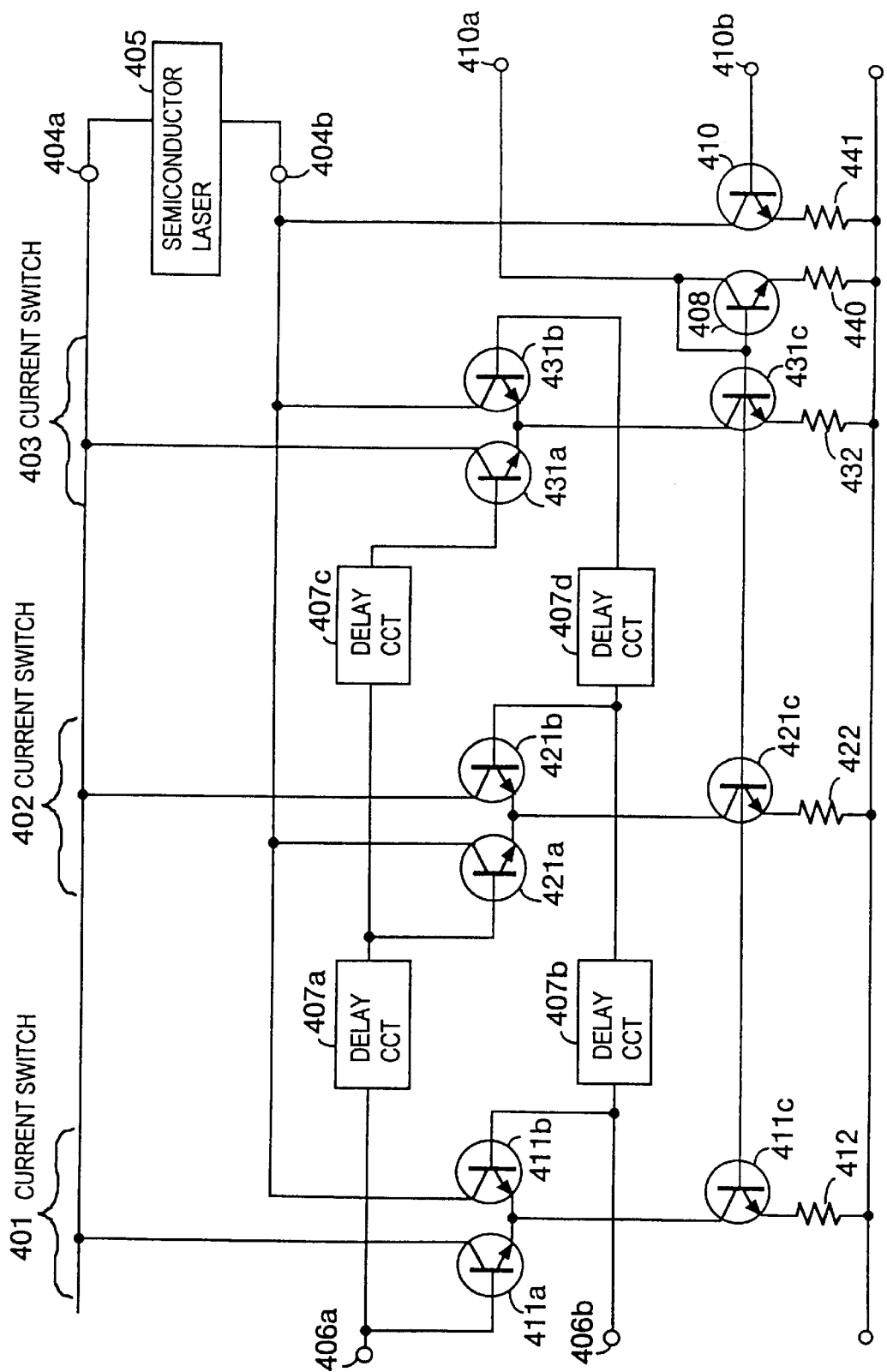
FIG. 18 is a circuit diagram illustrating a concrete example of a light intensity modulator according to a fourth embodiment of the present invention.
Figure 21:
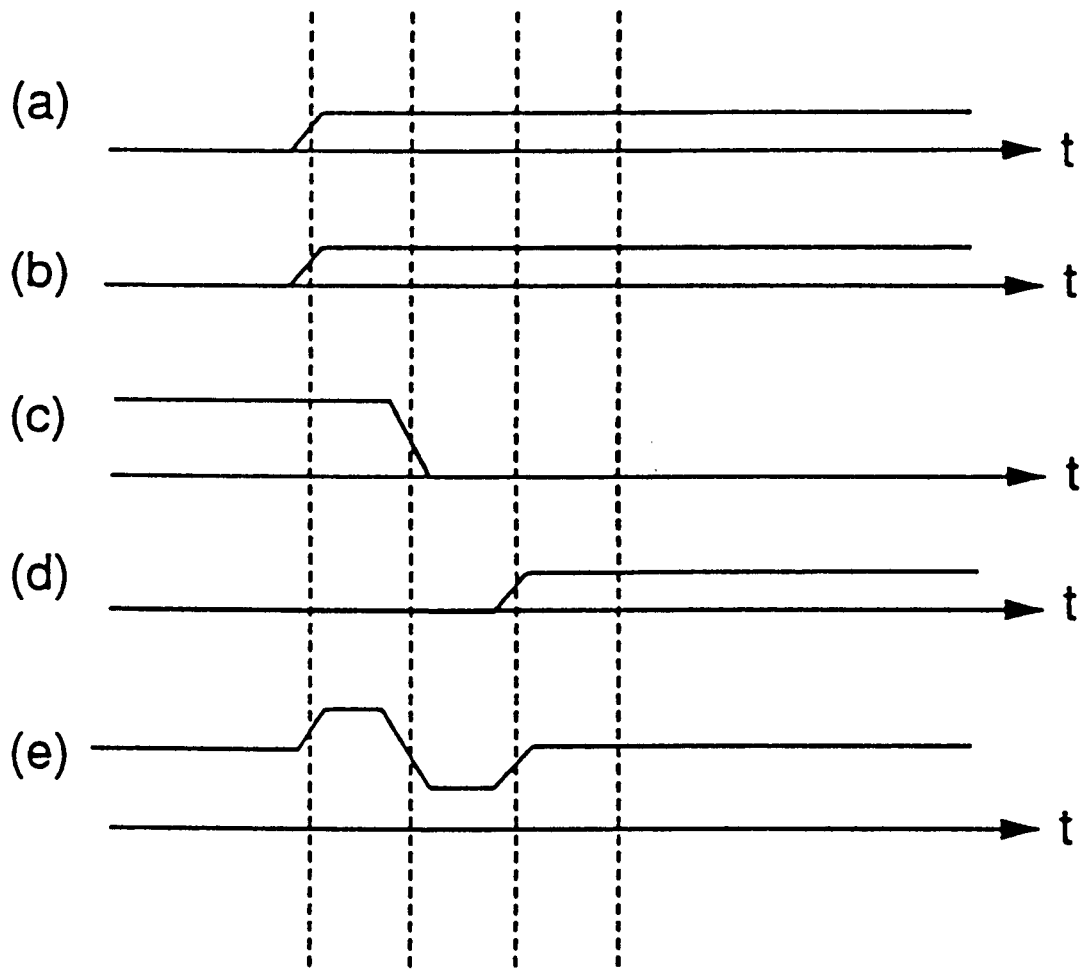
FIG. 21 is a timing chart for explaining the operation of the light intensity modulator depicted in FIG. 18.

FIG. 18 is a circuit diagram illustrating a first concrete example of a light intensity modulation device according to a third embodiment of the present invention, and FIG. 21 is a timing chart for explaining its operation. This light intensity modulation device comprises a driving circuit provided with current switching circuits 401 to 403, and a semiconductor laser 405 connected to output terminals 404a and 404b of the driving circuit.

The current switching circuit 401 is made up of transistors 411a to 411c and a resistor 412 for current regulation use. The transistor 411a has its collector connected to a line of the output terminal 404a (In this example the line connected to the output terminal 404a is called a $V_{CC}$ line.), has its base connected to a digital signal input terminal 406a and has its emitter connected to the emitter of the transistor 411b and the collected of the transistor 411c in common to them. The transistor 411b has its collector connected to the output terminal 404b and has its base connected to a digital signal input terminal 406b. The transistor 411c has its emitter grounded via the resistor 412, by which a constant-current source is formed.

The current switching circuit 402 is made up of transistors 421a to 421c and a resistor 422 for current regulation use. The transistor 421a has its base connected to the signal input terminal 406a via a delay circuit 407a, has its collector connected to the output terminal 404b and has its emitter connected to the emitter of the transistor 421b and the collected of the transistor 421c in common to them. The transistor 421b has its collector connected to the line (the $V_{CC}$ line) of the output terminal 404a and has its base connected to the digital signal input terminal 406b via a delay circuit 407b. The transistor 421c has its emitter grounded via the resistor 422, by which a constant-current source is formed. The resistance value of the resistor 422 is ½ that of the resistor 412 of the current switching circuit 401.

The current switching circuit 403 is made up transistors 431a to 431c and a resistor 432 for current regulation use. The transistor 431 a has its connector connected to the line (VCC line) of the output terminal 404a, has its base connected to the digital signal input terminal 406a via the delay circuits 407a and 407c and has its emitter connected to the emitter of the transistor 431b and the collector of the transistor 431c in common to them. The transistor 431b has its collector connected to the output terminal 404b, has its base connected to the digital signal input terminal 406b via the delay circuits 407b and 407d and has its emitter grounded via the resistor 432, by which a constant-current source is formed. The resistance value of the resistor 432 is set at the same value as that of the resistor 412 of the current switching circuit 401.

The bases of the transistors 411c, 421c and 431c of the current switching circuits 401 and 403 are connected in common to the base of a transistor 408 and to a terminal 410a. The transistor 408 has its collector connected to its base in common thereto and has its emitter grounded via a resistor 440. By this, a predetermined current can be fed to the output terminal 404b for current supply to the semiconductor laser 405 in accordance with a current that is supplied to the terminal 410a.

Furthermore, there is provided a transistor 410 which has its emitter grounded via a resistor 441, has its base connected to an output terminal 410b and has its collector connected to the output terminal 404b. By this, a predetermined bias current can be supplied to the semiconductor laser 405 in accordance with a current that is supplied to the terminal 410b.

In the light intensity modulation device of the above construction, differential digital signals which are opposite in logic to each other are applied to the digital signal input terminals 406a and 406b. When such signal-changing timing as shown in FIG. 21(*a*) occurs in the input differential digital signals, the first-stage current switching circuit 401 switches accordingly, causing in the semiconductor laser 405 such a current change as depicted in FIG. 21(*b*).

When the current switching circuit 401 switches, the second-stage current switching circuit 402 switches after a certain elapsed time by the delay circuits 407a and 407b (or due to a difference in response speed between the current switching circuits 401 and 402), with the result that such a current change as shown in FIG. 21(*c*) is provided to the semiconductor laser 405. In this case, since the current switching circuits 401 and 402 are adapted to be opposite in logic to each other and since their resistors 412 and 422 for current regulation use are adapted so that the resistance value of the resistor 422 is ½ that of the resistor 412, the current switching circuit 402 causes a current change twice larger than that by the current switching circuit 401.

When the current switching circuit 402 switches, the third-stage current switching circuit 403 switches after a certain elapsed time by the delay circuits 407c and 407d (or due to a difference in response speed between the current switching circuits 402 and 403), with the result that such a current change as shown in FIG. 21(d) is further provided to the semiconductor laser 405. In this case, since the current switching circuits 401 and 403 are common in logic and since their resistors 412 and 432 for current regulation use have the same resistance value, the current switching circuit 403 causes a current change equal to that by the current switching circuit 401.

By the above-described switching of the current switching circuits 401 to 403, such a current variation as shown in FIG. 21(e) is caused in the semiconductor laser 405. As a result, the semiconductor 405 is driven by such a current waveform as depicted in FIG. 21(e), that is, a opposite-polarity pulse pair, so that the rise timing and the fall timing can be optically transmitted as a pair of opposite-polarity pulses as described previously.

The light intensity modulation device described above is configured so that the current switching circuit 402 provides a current supply twice larger than those by the other current switching circuits by setting the resistance value of the resistor 422 of the switching circuit 402 to be ½ the resistance values of the resistors 421 and 423 of the other switching circuits; however, the present invention is not limited specifically to this configuration. For example, the current source of the current switching circuit 402 may be connected to a line which is different from those connected to the other switching circuits and is capable of supplying current twice larger than those of the other switching circuits.

Figure 22:
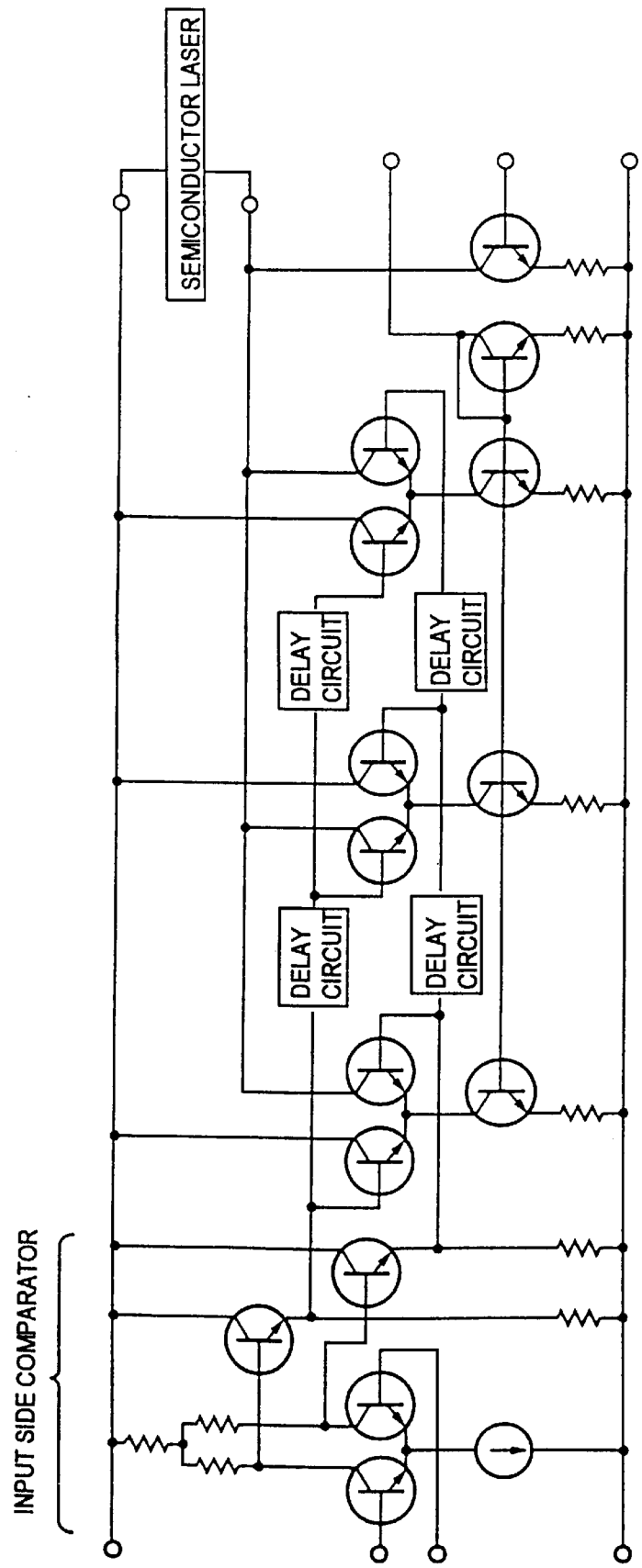
FIG. 22 is a circuit diagram illustrating another concrete example of the light intensity modulator according to the fourth embodiment of the present invention.
Figure 23:
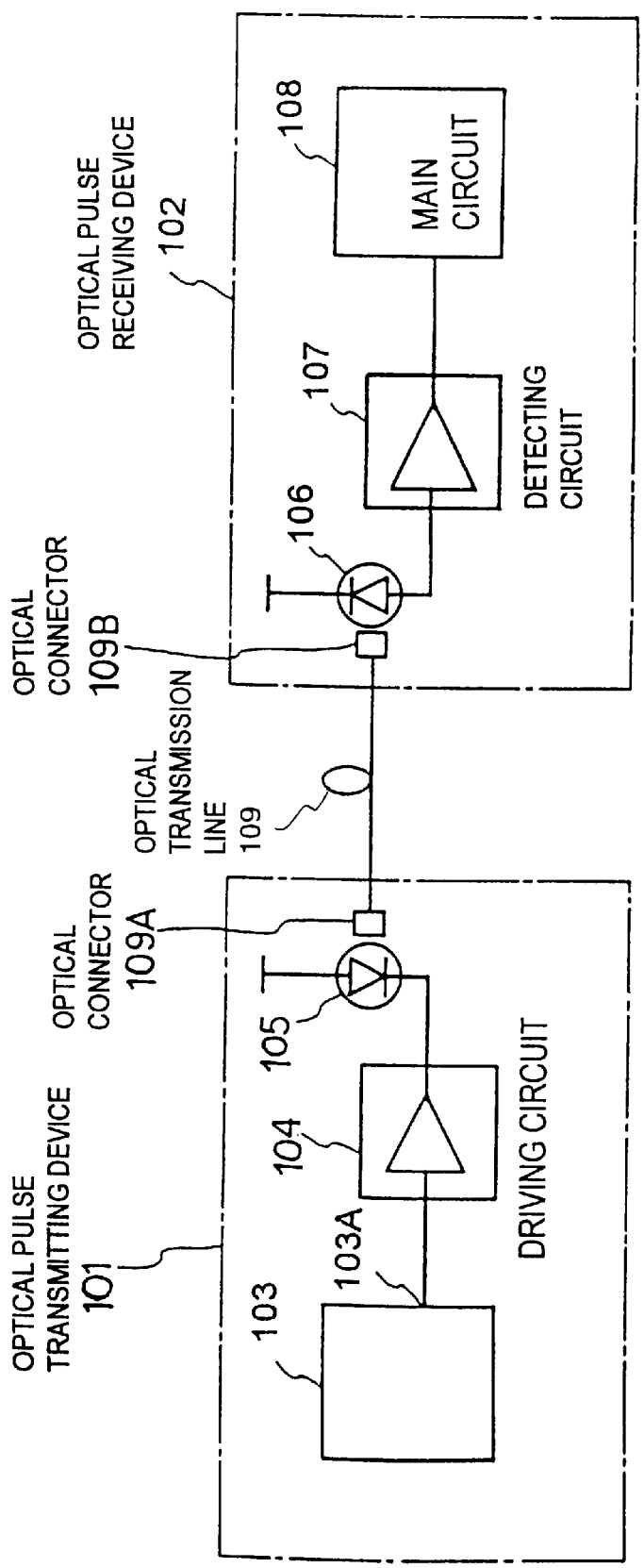
FIG. 23 is a block diagram illustrating the general configuration of a conventional optical pulse transmitting system.
Figure 26:
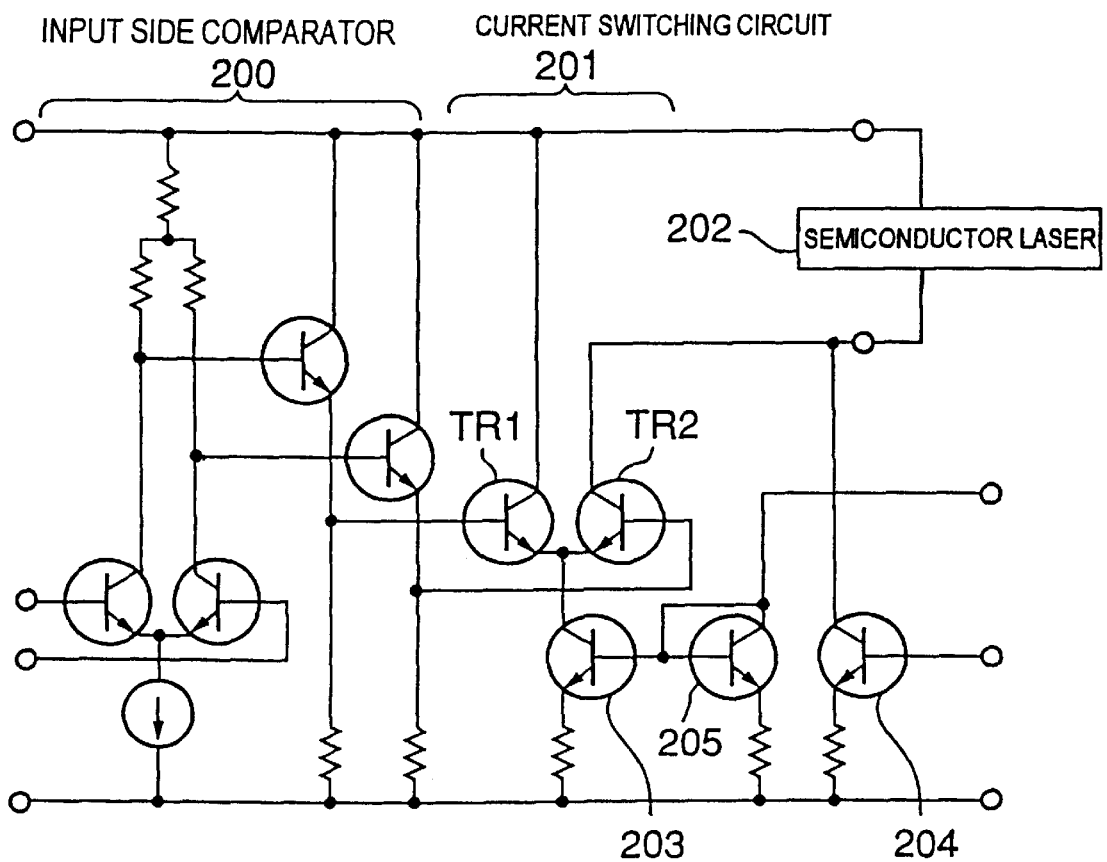
FIG. 26 is a circuit diagram showing an example of a light intensity modulator used in the conventional optical transmission system.
Figure 27:
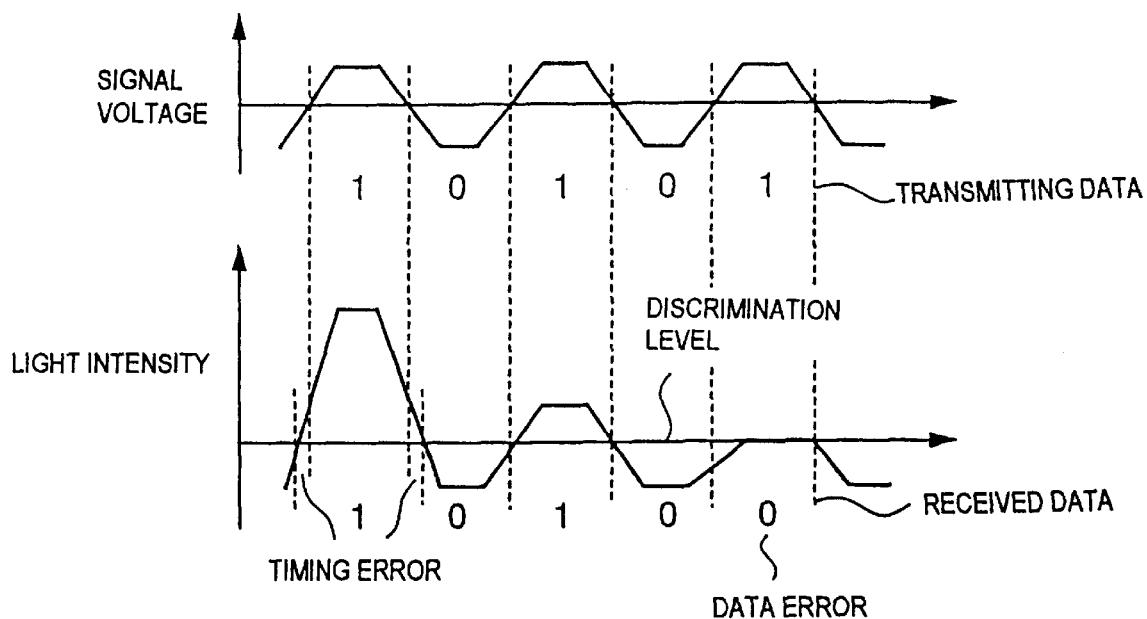
FIG. 27 is a timing chart for explaining data and timing errors occurring in the case of discriminating a binary signal, using a fixed threshold level.
Figure 28:
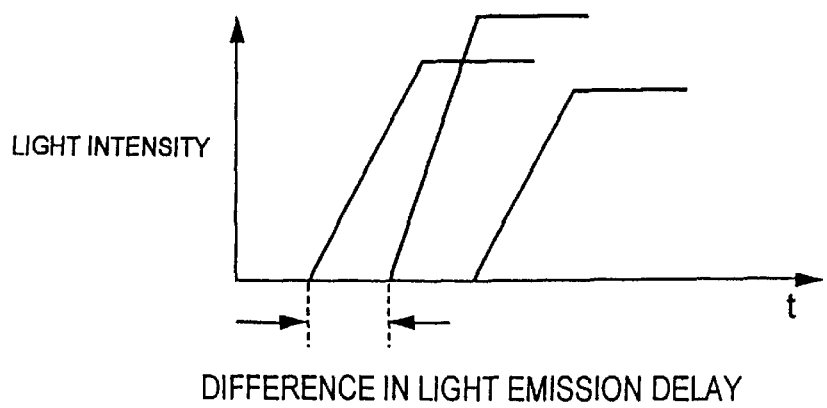
FIG. 28 is a graph showing the relationship between a light emission delay time and light intensity of the light emitting device.
Figure 29:
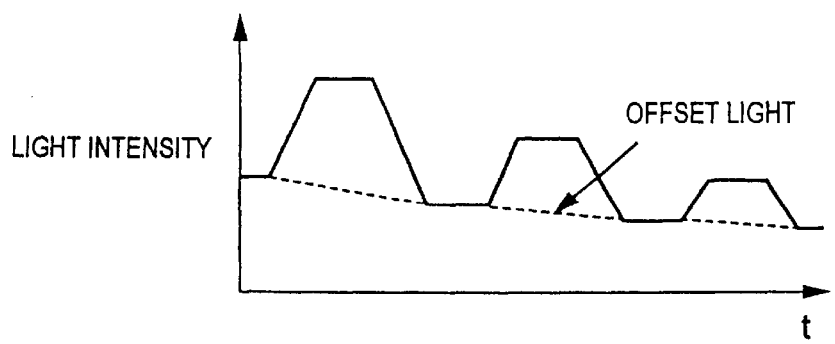
FIG. 29 is a waveform diagram for explaining light intensity modulation from offset light.
Figure 30:
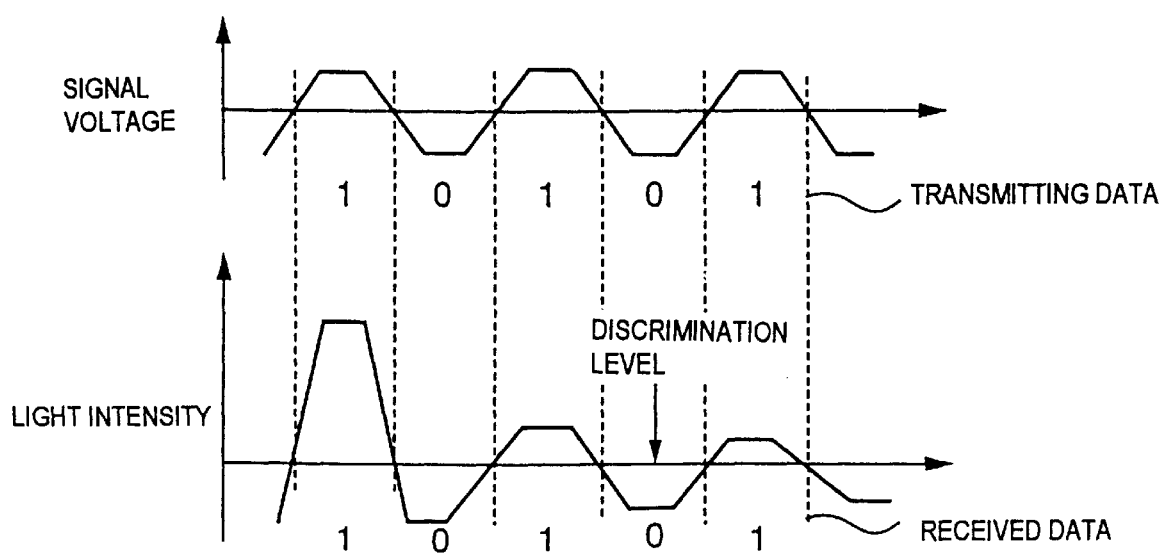
FIG. 30 is a timing chart for explaining a binary signal discriminating operation by an AC-coupled system.
Figure 31:
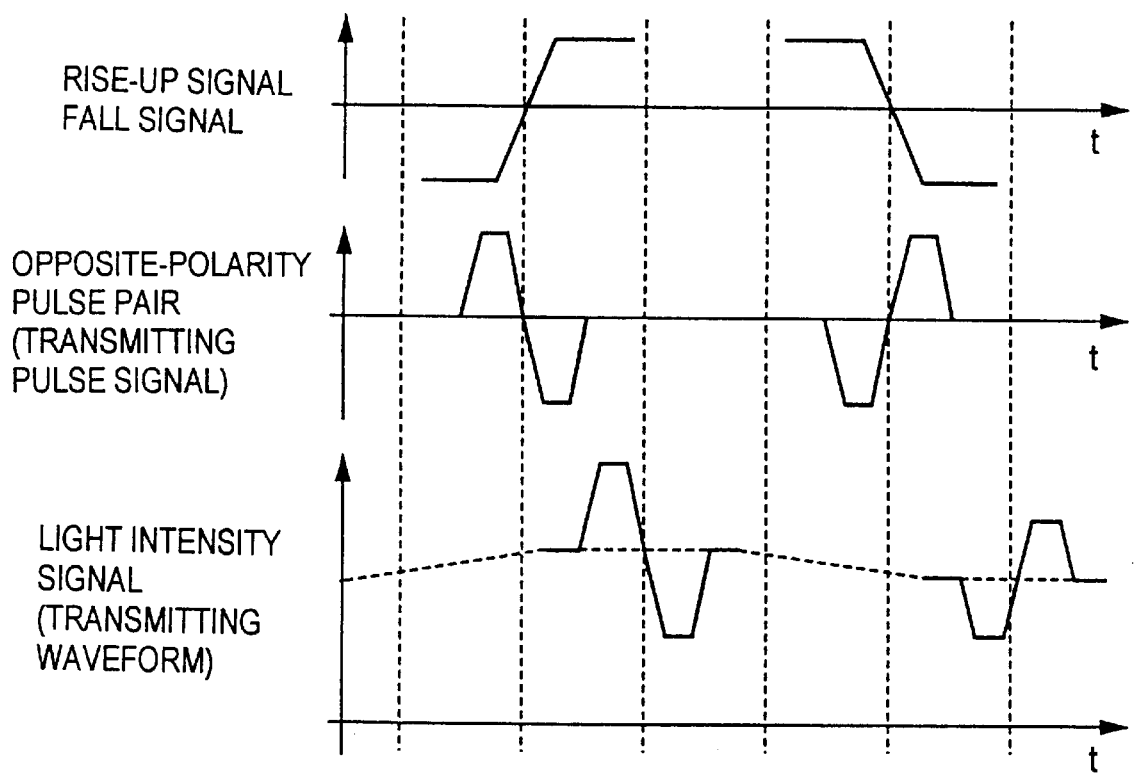
FIG. 31 is a timing chart for explaining a method for optically transmitting a binary electric signal by a pair of opposite-polarity pulses corresponding to leading and fall edges of the electric signal.
Figure 32:
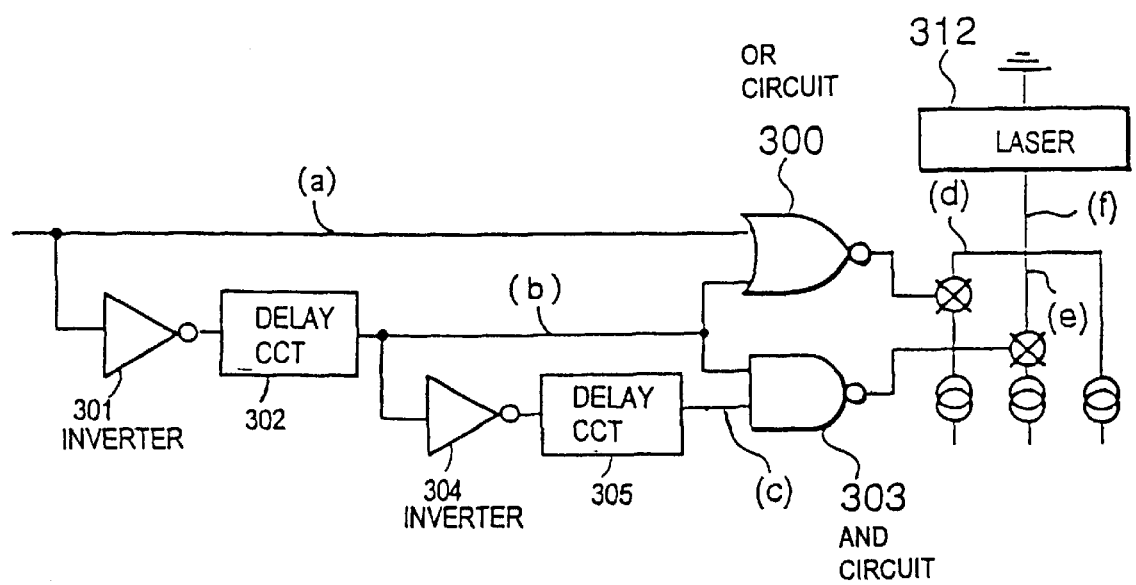
FIG. 32 is a block diagram showing another example of the light intensity modulator sued in the conventional optical transmission system.
Figure 33:
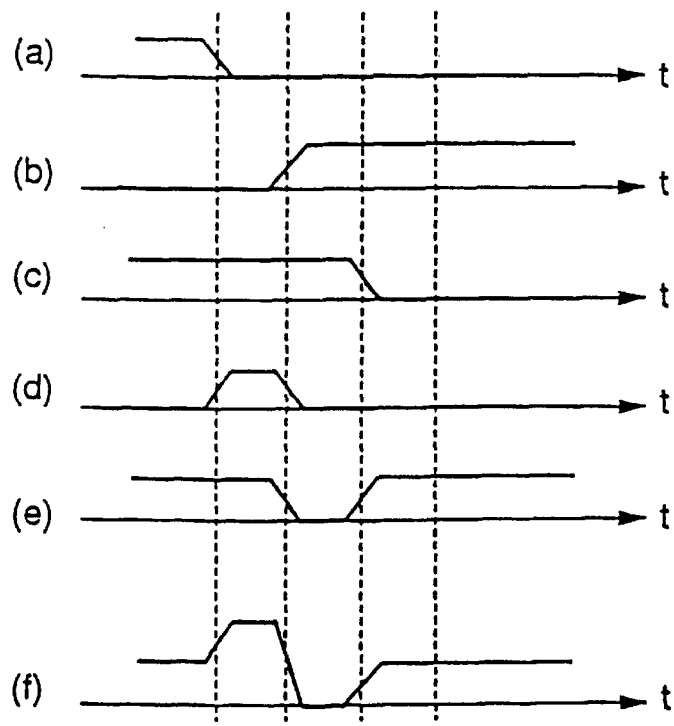
FIG. 33 is timing chart for explaining the operation of the light intensity modulator shown in FIG. 32.

Moreover, the input-side comparator depicted in FIG. 26 may be provided at the side of the digital signal input terminal as shown in FIG. 22 so that differential digital signals are generated which are opposite in logic in accordance with the digital input signal.

In the light intensity modulation device of this example, light emitting means (the light emitting device) may be formed by various semiconductor lasers, and other light emitting means (a light source) may be employed if optical transmission of its output light is possible. The optical transmission system using the above-described light intensity modulation device can be applied, for example, to a semiconductor device tester. In such an instance, a transmitting part composed of a transmitting waveform converting circuit and a light intensity modulation circuit is provided, for example, in the tester proper of the semiconductor device tester, and a receiving part composed of an AC-coupled receiving circuit, a discrimination circuit and an asynchronous RS flip-flop is provided in the test head, the transmitting part and the receiving part being interconnected via an optical fiber.

With such a configuration, a signal in which many periods are mixed and the binary data to be sent heavily inclines toward one particular value (0 or 1)—which is transmitted between the tester proper and the test head of the semiconductor device tester—is transmitted after conversion to transmitting pulse signals composed of a pair of opposite-polarity pulses which indicate the rise and the fall timing of the signal waveform, and the original transmitting signal waveform is electrically reproduced from the received rise and fall timing; hence, the signal regeneration can be performed without causing polarity and timing errors. This also permits accurate discrimination of DC-wise data fixed for a long time.

While the above semiconductor device tester has the transmitting part in the tester proper and the receiving part in the test head, it is also possible to employ a configuration opposite thereto (a configuration in which the tester proper has the receiving side and the test head the transmitting part).

As will be evident from the above, according to the present invention, there is no possibility that the threshold level inclines toward one particular data value of a binary signal, causing a timing error as in the past, and DC-wise data fixed for a long time can also be discriminated with accuracy; hence, a signal which is high in timing accuracy and unstable in period and contains a DC component can also be optically transmitted with high accuracy.

Thus, the present invention has an outstanding advantage that a signal in which many periods are mixed and binary data heavily inclines toward one particular value (0 or 1), like a signal which is transmitted between the tester proper and the test head of the semiconductor device tester, can also be optically transmitted with high accuracy.

Besides, when the polarity of data is left under a certain condition (under no-signal condition), a low-level fluctuation due to noise in such a state will not erroneously be detected as data; therefore, the present invention provides an advantage in offering a highly reliable optical transmission system.

With the application of the optical transmission system and method which produce such effects as mentioned above, the semiconductor device tester obtains the advantages of increased transmission rate, improved frequency characteristic, enhanced reliability and lightness.

According to the present invention, the waveform of an optical pulse to be transmitted over an optical transmission line is transmitted as a symmetrical waveform which goes both positive and negative equally about a bias value and whose mean value is equal to the bias value, and hence the DC component on the transmission line will not vary even if the signal transmission density changes. Thus, no jitter will be generated due to variations in the DC component contained in the signal being transmitted.

Furthermore, the DC component is added to the pulse waveform to be transmitted and since the receiving side uses the DC component to generate a reference voltage from the smoothing circuit 107B. Therefore, even in the case where the mean quantity of light emitted from the light emitting device LD varies with a change in its injected current vs. output light power and the reference voltage available from the smoothing circuit 107B varies accordingly, the voltage comparator 107C responds thereto by causing the hysteresis width to follow mainly the reference voltage, so that if the hysteresis width remains constant, the point of detection of the pulse at the receiving side remains unchanged, suppressing the generation of jitter.

In addition, when the point of detection of the pulse at the receiving side is set at a zero-crossing point of the symmetrical waveform, the received signal crosses the bias point at the highest speed; therefore, the configuration which detects the received pulse at this zero-crossing point provides an advantage that the receiving point can be detected with the highest degree of accuracy.

Additionally, according to the present invention, when the opposite-polarity pulse pair is generated, the edges of the both pulse waveforms do not become discontinuous as in the prior art—this permits optical signal transmission with high timing accuracy.

For the reasons given above, the light intensity modulation device, which produces such effects as mentioned above, provides the optical transmission system or semiconductor device tester with advantages such as increased signal transmission rate, improved frequency characteristic, reduced weight and enhanced reliability.

What is claimed is:

1. An optical transmission system comprising:
   in the transmitting side thereof,
      first edge detecting means and second edge detecting means for detecting a rise edge and a fall edge of a signal waveform to be transmitted, respectively;
      first transmitting pulse generating means for generating a first transmitting pulse signal constituted by a pair of opposite-polarity pulses, the opposite-polarity pulse pair inverting in their polarities at the point of the rise edge detection timing by said first edge detecting means;
      second transmitting pulse generating means for generating a second transmitting pulse signal constituted by a pair of opposite-polarity pulses, the opposite-polarity pulse pair inverting in their polarities at the point of the fall edge detection timing by said second edge detecting means;
      first light intensity modulation means for generating a first light intensity modulated signal based on said first transmitting pulse signal; and
      second light intensity modulation means for generating a second light intensity modulated signal based on said second transmitting pulse signal; and
   in the receiving side thereof,
      first AC-coupled receiving means for receiving said first light intensity modulated signal to obtain a first received signal consisting of only an AC component extracted from said first light intensity modulated signal;
      second AC-coupled receiving means for receiving said second light intensity modulated signal to obtain a second received signal consisting of only an AC component extracted from said second light intensity modulated signal;
      first discriminating means for discriminating the rise timing from said first received signal;
      second discriminating means for discriminating the fall timing from said second received signal; and
      signal regenerating means for regenerating the rise edge and fall edge relating to said signal waveform to be transmitted on the basis of said discriminated rise timing and the fall timing.

2. The optical transmission system as claimed in claim 1, wherein said first discriminating means discriminates, as the rise timing, a time point at which the polarity of the first received signal inverts, and said second discriminating means discriminates, as the fall timing, a time point at which the polarity of the second received signal inverts.

3. The optical transmission system as claimed in claim 2, wherein on the basis of a rise discrimination reference level serving as a reference for discrimination of the rise timing and a rise discrimination start level providing a timing for starting the discriminating operation of the rise timing, said first discriminating means is caused to be operative only during a fixed time interval starting at a time point when the rise edge of the first received signal intersects said rise discrimination start level, and discriminates, as the rise timing, a time point when the first received signal intersects said rise discrimination reference level during said first discriminating means is operative; and
wherein on the basis of a fall discrimination reference level serving as a reference for discrimination of the fall timing and a fall discrimination start level providing a timing for starting the discriminating operation of the fall timing, said second discriminating means is caused to be operative only during a fixed time interval starting at a time point when the fall edge of the second received signal intersects said fall discrimination start level, and discriminates, as the fall timing, a time point when the second received signal intersects said fall discrimination reference level during said second discriminating means is operative.

4. The optical transmission system as claimed in claim 1, wherein said signal regenerating means is constituted by an asynchronous SR flip-flop circuit which is set by the rise timing discriminated by said first discriminating means and reset by the fall timing discriminated by said second discriminating means.

5. An optical transmission system comprising:
   in the transmitting side thereof,
      first edge detecting means and second edge detecting means for detecting a rise edge and a fall edge of a signal waveform to be transmitted, respectively;
      first transmitting pulse generating means for generating a first transmitting pulse signal constituted by a pair of opposite-polarity pulses, the opposite-polarity pulse pair inverting in their polarities at the point of the rise edge detection timing by said first edge detecting means;
      second transmitting pulse generating means for generating a second transmitting pulse signal constituted by a pair of opposite-polarity pulses, the opposite-polarity pulse pair inverting in their polarities at the point of the fall edge detection timing by said second edge detecting means and having the inverted polarities of said first transmitting pulse signal;
      light intensity modulation means for generating a light intensity modulated signal based on the first transmitting pulse signal and the second transmitting pulse signal; and
   in the receiving side thereof,
      AC-coupled receiving means for receiving the light intensity modulated signal to obtain a received signal consisting of only an AC component extracted from said light intensity modulated signal;
      discriminating means for detecting, from the received signal, signals relating to the first and the second transmitting pulse signals as well as discriminating the rise timing and the fall timing on the basis of the relationship of their polarities inverted each other; and
      signal regenerating means for regenerating the rise edge and the fall edge relating to said signal waveform to be transmitted on the basis of the rise timing and the fall timing.

6. The optical transmission system as claimed in claim 5, wherein said discriminating means comprises:
   a first discrimination circuit for discriminating, as the rise timing, a time point when the polarity of that signal in the received signals which relates to the first transmitting pulse signal inverts from positive to negative; and
   a second discrimination circuit for discriminating, as the fall timing, a time point when the polarity of that signal in the received signals which relates to the second transmitting pulse signal inverts from negative to positive.

7. The optical transmission system as claimed in claim 6, wherein, on the basis of a discrimination reference level serving as a reference for discrimination of a timing, a rise discrimination start level providing a timing for starting the discriminating operation of the rise timing, and a fall discrimination start level providing a timing for starting the discriminating operation of the fall timing, in case of discriminating the rise timing, said first discriminating means is caused to be enabled only during a fixed time interval from as well as said second discriminating means is caused to be disabled from a time point when the rise edge of the first received signal intersects said rise discrimination start level, and during said first discriminating means is enabled, a time point when the received signal intersects said discrimination reference level is discriminated as the rise timing; and in case of discriminating the fall timing, said second discriminating means is caused to be enabled only during a fixed time interval from as well as said first discriminating means is caused to be disabled from a time point when the fall edge of the received signal intersects said fall discrimination start level, and during said second discriminating means is enabled, a time point when the received signal intersects said discrimination reference level is discriminated as the fall timing.

8. The optical transmission system as claimed in claim 5, wherein said signal regenerating means is constituted by an asynchronous SR flip-flop circuit which is set by the rise timing and reset by the fall timing discriminated by said discriminating means, respectively.

9. A semiconductor device testing apparatus provided with the optical transmission system described in any one of claims 1 to 8 and in which a tester proper of the testing apparatus for transmitting a binary signal and a test head of the testing apparatus for receiving a binary signal are interconnected via an optical fiber and an optical transmission is effected between said tester proper and said test head using the optical transmission system.

10. A method of transmitting an optical signal comprising:

a first step of detecting a rise edge and a fall edge of a signal waveform to be transmitted, respectively;

a second step of generating a first transmitting pulse signal constituted by a pair of opposite-polarity pulses, the opposite-polarity pulse pair inverting in their polarities at the point of the rise edge detection timing as well as generating a second transmitting pulse signal constituted by a pair of opposite-polarity pulses, the opposite-polarity pulse pair inverting in their polarities at the point of the fall edge detection timing;

a third step of generating a first light intensity modulated signal based on the first transmitting pulse signal and a second light intensity modulated signal based on the second transmitting pulse signal, and sending out these modulated signals separately onto an optical transmission line;

a fourth step of receiving the first and the second light intensity modulated signals individually and obtaining first and second received signals consisting of only AC components respectively extracted from the first and the second light intensity modulated signals; and a fifth step of discriminating a rise timing from the first received signal as well as discriminating a fall timing from the second received signal, and regenerating a rise edge and a fall edge relating to said signal waveform to be transmitted on the basis of the rise timing and the fall timing thus discriminated.

11. The method as claimed in claim 10, wherein the discrimination of the rise timing and the fall timing in said fifth step is performed by discriminating the time point at which the polarity of the first received signal inverts as the rise timing and the time point at which the polarity of the second received signal inverts as the fall timing.

12. The method as claimed in claim 11, wherein in case of discriminating the rise timing, on the basis of a rise discrimination reference level serving as a reference for discrimination of a rise timing and a rise discrimination start level providing a timing for starting the discriminating operation of the rise timing, a time point when the first received signal intersects said rise discrimination reference level within a fixed time interval starting at a time point when the rise edge of the first received signal intersects said rise discrimination start level is discriminated as the rise timing; and in case of discriminating the fall timing, on the basis of a fall discrimination reference level serving as a reference for discrimination of a fall timing and a fall discrimination start level providing a timing for starting the discriminating operation of the fall timing, a time point when the second received signal intersects said fall discrimination reference level within a fixed time interval starting at a time point when the fall edge of the second received signal intersects said fall discrimination start level is discriminated as the fall timing.

13. A method of transmitting an optical signal comprising:

a first step of detecting a rise edge and a fall edge from a signal waveform to be transmitted, respectively;

a second step of generating a first transmitting pulse signal constituted by a pair of opposite-polarity pulses, the opposite-polarity pulse pair inverting in their polarities at the point of the rise edge detection timing as well as generating a second transmitting pulse signal constituted by a pair of opposite-polarity pulses, the opposite-polarity pulse pair inverting in their polarities at the point of the fall edge detection timing and having the inverted polarities of said first transmitting pulse signal;

a third step of generating a light intensity modulated signal based on the first and the second transmitting pulse signals and sending out the modulated signal onto an optical transmission line;

a fourth step of receiving the light intensity modulated signal to obtain a received signal consisting of only an AC component extracted from the light intensity modulated signal; and a fifth step of detecting, from the received signal, signals relating to the first and the second transmitting pulse signals as well as discriminating the rise timing and the fall timing on the basis of the relationship of their polarities inverted each other, and regenerating the rise edge and the fall edge relating to said signal waveform to be transmitted on the basis of the discriminated rise timing and the fall timing.

14. The method as claimed in claim 13, wherein the discrimination of the rise timing and the fall timing in said fifth step is performed by discriminating, as the rise timing, a time point when the polarity of that signal in the received signals which relates to the first transmitting pulse signal inverts from positive to negative; and discriminating, as the fall timing, a time point when the polarity of that signal in the received signals which relates to the second transmitting pulse signal inverts from negative to positive.

15. The method as claimed in claim 14, wherein, on the basis of a discrimination reference level serving as a reference for discrimination of a timing, a rise discrimination start level providing a timing for starting the discriminating operation of the rise timing, and a fall discrimination start level providing a timing for starting the discriminating operation of the fall timing, in case of discriminating the rise timing, the rise timing discrimination is enabled only during a fixed time interval from as well as the fall timing discrimination is disabled from a time point when the rise edge of the received signal intersects said rise discrimination start level, and within said fixed time interval, a time point when the received signal intersects said discrimination reference level is discriminated as the rise timing; and in case of discriminating the fall timing, the fall timing discrimination is enabled only during a fixed time interval from as well as the rise timing discrimination is disabled from a time point when the fall edge of the received signal intersects said fall discrimination start level, and within said fixed time interval, a time point when the received signal intersects said discrimination reference level is discriminated as the fall timing.

* * * * *